(12) United States Patent
Zhong et al.

(10) Patent No.: US 11,455,826 B2
(45) Date of Patent: Sep. 27, 2022

(54) METHOD FOR IDENTIFYING FINGERPRINT, FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventors: Xiang Zhong, Shenzhen (CN); Weiwen Chen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/358,926

(22) Filed: Jun. 25, 2021

(65) Prior Publication Data

US 2021/0319207 A1 Oct. 14, 2021

Related U.S. Application Data

(63) Continuation of application No. PCT/CN2019/112314, filed on Oct. 21, 2019.

(51) Int. Cl.
*G06V 40/12* (2022.01)
*G06V 40/13* (2022.01)

(52) U.S. Cl.
CPC ...... *G06V 40/1365* (2022.01); *G06V 40/1318* (2022.01)

(58) Field of Classification Search
CPC ............................. G06V 40/12–1394
See application file for complete search history.

(56) References Cited

U.S. PATENT DOCUMENTS

| | | | |
|---|---|---|---|
| 6,292,576 B1 | 9/2001 | Brownlee | |
| 9,483,681 B2 * | 11/2016 | Kumar | G06V 40/1365 |
| 10,482,311 B2 * | 11/2019 | Wu | G06V 40/12 |
| 11,176,348 B2 * | 11/2021 | Xie | G06V 40/1382 |
| 11,250,235 B2 * | 2/2022 | Chen | G06F 3/0421 |

(Continued)

FOREIGN PATENT DOCUMENTS

| | | |
|---|---|---|
| CN | 101226589 A | 7/2008 |
| CN | 108255356 A | 7/2018 |

(Continued)

*Primary Examiner* — Patrick F Marinelli

(57) ABSTRACT

A method for identifying a fingerprint, a fingerprint identification apparatus and an electronic device are provided. The method includes: acquiring light signals in multiple directions reflected via a sampled object above a display screen; generating a plurality of two-dimensional 2D fingerprint images respectively based on the light signals; determining whether the sampled object is a three-dimensional 3D object based on the plurality of 2D fingerprint images; and if the sampled object is the 3D object, performing fingerprint identification based on at least one of the plurality of 2D fingerprint images. A distinction between a 2D object and a 3D object is effectively achieved through the light signals in the multiple directions, and when the sampled object is a 3D object, subsequent fingerprint identification is performed, which fundamentally avoids performing the fingerprint identification based on a fake fingerprint captured by a 2D object, thereby improving security of the fingerprint identification.

18 Claims, 26 Drawing Sheets

(56) References Cited

U.S. PATENT DOCUMENTS

| | | | |
|---|---|---|---|
| 11,270,092 B2* | 3/2022 | Chang | G06V 40/1359 |
| 2017/0200043 A1* | 7/2017 | Wu | G06V 40/12 |
| 2018/0047206 A1 | 2/2018 | Sivalingam | |
| 2018/0196991 A1 | 7/2018 | Choi et al. | |
| 2018/0225498 A1 | 8/2018 | Setlak | |
| 2019/0034020 A1* | 1/2019 | He | G06V 40/1318 |
| 2019/0180071 A1* | 6/2019 | Kim | G06V 40/1359 |
| 2019/0213378 A1* | 7/2019 | Li | G06V 10/993 |
| 2019/0303639 A1* | 10/2019 | He | G06V 40/1394 |
| 2020/0218392 A1 | 7/2020 | He | |
| 2020/0279090 A1* | 9/2020 | He | G06V 40/1365 |
| 2020/0292741 A1 | 9/2020 | Rhee et al. | |
| 2021/0042494 A1* | 2/2021 | Xie | G06V 40/1318 |
| 2021/0056284 A1* | 2/2021 | Jiang | G06V 40/1335 |
| 2021/0117643 A1* | 4/2021 | Li | G06V 40/1335 |
| 2021/0319207 A1* | 10/2021 | Zhong | G06F 3/0412 |
| 2021/0326566 A1* | 10/2021 | Chen | G06F 3/0421 |

FOREIGN PATENT DOCUMENTS

| | | |
|---|---|---|
| CN | 109154959 A | 1/2019 |
| CN | 109190554 A | 1/2019 |
| CN | 109376687 A | 2/2019 |
| EP | 2047622 B1 | 5/2019 |
| WO | WO2018014629 A1 | 1/2018 |

\* cited by examiner

| 2 | 1 | 2 | 1 | 2 | 1 | 2 | 1 |
|---|---|---|---|---|---|---|---|
| 3 | 4 | 3 | 4 | 3 | 4 | 3 | 4 |
| 2 | 1 | 2 | 1 | 2 | 1 | 2 | 1 |
| 3 | 4 | 3 | 4 | 3 | 4 | 3 | 4 |
| 2 | 1 | 2 | 1 | 2 | 1 | 2 | 1 |
| 3 | 4 | 3 | 4 | 3 | 4 | 3 | 4 |
| 2 | 1 | 2 | 1 | 2 | 1 | 2 | 1 |
| 3 | 4 | 3 | 4 | 3 | 4 | 3 | 4 |

| 1 | 1 | 2 | 2 |
|---|---|---|---|
| 1 | 1 | 2 | 2 |
| 1 | 1 | 2 | 2 |
| 1 | 1 | 2 | 2 |
| 1 | 1 | 2 | 2 |

FIG. 15

| 2 | | 1 | | | |
| --- | --- | --- | --- | --- | --- |
| | | | 2 | | 1 |
| | 3 | 2 | 4 | 1 | 0 |
| 2 | | 1 | 0 | 3 | | 4 |
| | 0 | 3 | 2 | 4 | 1 |
| 3 | | 4 | | 0 | |
| | | | 3 | | 3 |

25

| 2 | 2 | 1 | 1 | 2 | 2 | 1 | 1 |
|---|---|---|---|---|---|---|---|
| 2 | 2 | 1 | 1 | 2 | 2 | 1 | 1 |
| 3 | 3 | 4 | 4 | 3 | 3 | 4 | 4 |
| 3 | 3 | 4 | 4 | 3 | 3 | 4 | 4 |
| 2 | 2 | 1 | 1 | 2 | 2 | 1 | 1 |
| 2 | 2 | 1 | 1 | 2 | 2 | 1 | 1 |
| 3 | 3 | 4 | 4 | 3 | 3 | 4 | 4 |
| 3 | 3 | 4 | 4 | 3 | 3 | 4 | 4 |

70

METHOD FOR IDENTIFYING FINGERPRINT, FINGERPRINT IDENTIFICATION APPARATUS AND ELECTRONIC DEVICE

CROSS REFERENCE TO RELATED APPLICATIONS

This application is a continuation of International Application No. PCT/CN2019/112314, filed on Oct. 21, 2019, the disclosure of which is hereby incorporated by reference in its entirety.

TECHNICAL FIELD

Embodiments of the present application relate to the field of under-screen fingerprint identification, and more particularly, to a method for identifying a fingerprint, a fingerprint identification apparatus and an electronic device.

BACKGROUND

Optical fingerprint identification technology has a risk of misidentification. For example, a fake fingerprint containing some fingerprint information is placed at a sampling position, and a fingerprint image to be matched is generated by light and shadow imaging. When matching between the fingerprint image and a template in a database is successful, an "unlock" operation is completed.

Due to a wide range of ways to acquire personal fingerprint information and clear fingerprint characteristics and low manufacturing costs of a 2D fingerprint image mold, a solution that fingerprint identification is performed based on a 2D fingerprint image has great security risks.

At present, security of fingerprint identification is improved by detecting whether a sampled object disposed above a display screen is a live finger. For example, whether the sampled object is a live finger may be determined by heart rate detection technology or filtering identification technology. For the heart rate detection technology, whether the sampled object is a fake fingerprint is authenticated by determining whether the sampled object has a heart rate. For the filtering identification technology, whether the sampled object is a fake fingerprint is authenticated based on a color of a captured fingerprint image by using filters at different wavelengths.

However, the heart rate detection technology has relatively high costs and places relatively high requirements for implementation scenes, and the filtering identification technology has relatively low accuracy.

Therefore, there is an urgent need for a technical solution that can improve security of optical fingerprint identification.

SUMMARY

A method for identifying a fingerprint, a fingerprint identification apparatus and an electronic device are provided, which can improve security of optical fingerprint identification.

According to a first aspect, a method for identifying a fingerprint is provided, which is applicable to an electronic device having a display screen to implement under-screen fingerprint identification, and the method includes:

acquiring light signals in multiple directions reflected via a sampled object above the display screen;

generating a plurality of two-dimensional 2D fingerprint images respectively based on the light signals in the multiple directions;

determining whether the sampled object is a three-dimensional 3D object based on the plurality of 2D fingerprint images; and if the sampled object is the 3D object, performing fingerprint identification based on at least one of the plurality of 2D fingerprint images.

In short, a distinction between a 2D object and a 3D object is effectively achieved through the light signals in the multiple directions, and when the sampled object is a 3D object, subsequent fingerprint identification is performed, which fundamentally avoids performing the fingerprint identification based on a fake fingerprint captured by a 2D object, thereby improving security of the fingerprint identification.

In some possible implementation manners, the determining whether the sampled object is the three-dimensional 3D object based on the plurality of 2D fingerprint images, includes:

determining whether the plurality of 2D fingerprint images are the same; and if the plurality of 2D fingerprint images are different, determining that the sampled object is the 3D object.

In some possible implementation manners, the determining whether the plurality of 2D fingerprint images are the same, includes:

if curvature of the plurality of 2D fingerprint images with respect to a same image line is different, determining that the plurality of 2D fingerprint images are different; and/or if widths of the plurality of 2D fingerprint images with respect to a same image line are different, determining that the plurality of 2D fingerprint images are different.

In some possible implementation manners, the performing the fingerprint identification based on the at least one of the plurality of 2D fingerprint images, includes:

generating a target 2D fingerprint image based on the plurality of 2D fingerprint images, image lines of the target 2D fingerprint image including image lines of the plurality of 2D fingerprint images overlapping each other; and performing the fingerprint identification based on the target 2D fingerprint image.

In some possible implementation manners, the performing the fingerprint identification based on the target 2D fingerprint image, includes:

if matching between the target 2D fingerprint image and a pre-stored 2D fingerprint image is successful, determining that the fingerprint identification is successful; and/or if matching between the target 2D fingerprint image and a pre-stored 2D fingerprint image is failed, determining that the fingerprint identification is failed.

In some possible implementation manners, the performing the fingerprint identification based on the target 2D fingerprint image, includes:

generating a target 3D fingerprint image based on the target 2D fingerprint image; and performing the fingerprint identification based on the target 3D fingerprint image.

In some possible implementation manners, the generating the target 3D fingerprint image based on the target 2D fingerprint image, includes:

determining a height of each line unit on each image line in the target 2D fingerprint image based on the target 2D fingerprint image and a first 2D fingerprint image of the plurality of 2D fingerprint images; and generating the target 3D fingerprint image based on the height of the each line unit on the each image line in the target 2D fingerprint image.

In some possible implementation manners, the determining the height of the each line unit on the each image line in the target 2D fingerprint image based on the target 2D fingerprint image and the first 2D fingerprint image of the plurality of 2D fingerprint images, includes:

for the each line unit on the each image line in the target 2D fingerprint image, subtracting, from a width of each line unit on each image line in the first 2D fingerprint image, a width of a same line unit on a same image line in the target 2D fingerprint image, to obtain a target width corresponding to the each line unit on the each image line in the target 2D fingerprint image; and determining the height of the each line unit on the each image line in the target 2D fingerprint image based on the target width corresponding to the each line unit on the each image line in the target 2D fingerprint image.

In some possible implementation manners, the determining the height of the each line unit on the each image line in the target 2D fingerprint image based on the target width corresponding to the each line unit on the each image line in the target 2D fingerprint image, includes:

determining the height of the each line unit on the each image line in the target 2D fingerprint image according to the following formula:

$$H = K \times d \times \tan \theta;$$

where H represents a height of a line unit on an image line in the target 2D fingerprint image, K represents a reduction ratio of a project of the sampled object on the display screen to the first 2D fingerprint image, d represents the target width, and θ represents an included angle between a light signal used to form the first 2D fingerprint image in the light signals in the multiple directions and a finger rigid.

In some possible implementation manners, the performing the fingerprint identification based on the target 3D fingerprint image, includes:

if matching between the target 3D fingerprint image and a pre-stored 3D fingerprint image is successful, determining that the fingerprint identification is successful; and/or if matching between the target 3D fingerprint image and a pre-stored 3D fingerprint image is failed, determining that the fingerprint identification is failed.

Optionally, in some possible implementation manners, the light signals in the multiple directions include a light signal perpendicular relative to the display screen and a light signal oblique relative to the display screen; or the light signals in the multiple directions include light signals oblique relative to the display screen.

According to a second aspect, a fingerprint identification apparatus is provided, and the fingerprint identification apparatus is applicable to an electronic device having a display screen and disposed under the display screen to implement under-screen fingerprint identification; and the fingerprint identification apparatus includes:

an optical sensing pixel array, the optical sensing pixel array being configured to acquire light signals in multiple directions reflected via a sampled object above the display screen; and a processor, the processor being connected to the optical sensing pixel array, and the processor being configured to:

receive the light signals in the multiple directions transmitted by the optical sensing pixel array, and generate a plurality of two-dimensional 2D fingerprint images respectively based on the light signals in the multiple directions;

determine whether the sampled object is a three-dimensional 3D object based on the plurality of 2D fingerprint images; and if the sampled object is the 3D object, perform fingerprint identification based on at least one of the plurality of 2D fingerprint images.

Optionally, in some possible implementation manners, the processor is specifically configured to:

determine whether the plurality of 2D fingerprint images are the same; and if the plurality of 2D fingerprint images are different, determine that the sampled object is the 3D object.

In some possible implementation manners, the processor is more specifically configured to:

if curvature of the plurality of 2D fingerprint images with respect to a same image line is different, determine that the plurality of 2D fingerprint images are different; and/or if widths of the plurality of 2D fingerprint images with respect to a same image line are different, determine that the plurality of 2D fingerprint images are different.

In some possible implementation manners, the processor is specifically configured to:

generate a target 2D fingerprint image based on the plurality of 2D fingerprint images, image lines of the target 2D fingerprint image including image lines of the plurality of 2D fingerprint images overlapping each other; and perform the fingerprint identification based on the target 2D fingerprint image.

In some possible implementation manners, the processor is more specifically configured to:

if matching between the target 2D fingerprint image and a pre-stored 2D fingerprint image is successful, determine that the fingerprint identification is successful; and/or if matching between the target 2D fingerprint image and a pre-stored 2D fingerprint image is failed, determine that the fingerprint identification is failed.

In some possible implementation manners, the processor is more specifically configured to:

generate a target 3D fingerprint image based on the target 2D fingerprint image; and perform the fingerprint identification based on the target 3D fingerprint image.

In some possible implementation manners, the processor is more specifically configured to:

determine a height of each line unit on each image line in the target 2D fingerprint image based on the target 2D fingerprint image and a first 2D fingerprint image of the plurality of 2D fingerprint images; and generate the target 3D fingerprint image based on the height of the each line unit on the each image line in the target 2D fingerprint image.

In some possible implementation manners, the processor is more specifically configured to:

for the each line unit on the each image line in the target 2D fingerprint image, subtract, from a width of each line unit on each image line in the first 2D fingerprint image, a width of a same line unit on a same image line in the target 2D fingerprint image, to obtain a target width corresponding to the each line unit on the each image line in the target 2D fingerprint image; and determine the height of the each line unit on the each image line in the target 2D fingerprint image based on the target width corresponding to the each line unit on the each image line in the target 2D fingerprint image.

In some possible implementation manners, the processor is more specifically configured to:

determine the height of the each line unit on the each image line in the target 2D fingerprint image according to the following formula:

$$H = K \times d \times \tan\theta;$$

where H represents a height of the same line unit on the same image line in the target 2D fingerprint image, K represents a reduction ratio of a project of the sampled object on the display screen to a 2D fingerprint image of the plurality of 2D fingerprint images, d represents the target width, and θ represents an included angle between a light signal used to form the first 2D fingerprint image in the light signals in the multiple directions and a finger rigid.

Optionally, in some possible implementation manners, the processor is more specifically configured to:

if matching between the target 3D fingerprint image and a pre-stored 3D fingerprint image is successful, determine that the fingerprint identification is successful; and/or if matching between the target 3D fingerprint image and a pre-stored 3D fingerprint image is failed, determine that the fingerprint identification is failed.

In some possible implementation manners, the light signals in the multiple directions include a light signal perpendicular relative to the display screen and a light signal oblique relative to the display screen; or the light signals in the multiple directions include light signals oblique relative to the display screen.

According to a third aspect, an electronic device is provided, including:

a display screen; and the fingerprint identification apparatus in the second aspect or any one of possible implementation manners of the second aspect, where the fingerprint identification apparatus is disposed under a display region of the display screen to implement under-screen fingerprint identification.

BRIEF DESCRIPTION OF DRAWINGS

FIG. 5 to FIG. 33 are schematic structural diagrams of a fingerprint detection apparatus according to embodiments of the present application.

DESCRIPTION OF EMBODIMENTS

Technical solutions in the present application will be described hereinafter with reference to accompanying drawings.

The technical solutions of embodiments of the present application may be applied to various electronic devices. For example, portable or mobile computing devices such as smartphones, laptops, tablets and gaming devices, and other electronic devices such as electronic databases, automobiles and bank automated teller machines (ATM), which are not limited in the embodiments of the present application.

The technical solutions of the embodiments of the present application may be applied to biometric identification technology. The biometric identification technology includes, but is not limited to, identification technologies, such as fingerprint identification, palm print identification, iris identification, human face identification and living body identification. For convenience of illustration, fingerprint identification technology is described below as an example.

The technical solutions of the embodiments of the present application may be used for under-screen fingerprint identification technology and in-screen fingerprint identification technology.

The under-screen fingerprint identification technology refers to mounting a fingerprint identification module under a display screen, so as to achieve a fingerprint identification operation in a display region of the display screen without setting a fingerprint capturing region in a region other than the display region on a front face of an electronic device. Specifically, the fingerprint identification module uses light returned from a top surface of a display component of the electronic device for fingerprint sensing and other sensing operations. This returned light carries information about an object (for example, a finger) that is in contact with or near the top surface of the display component, and the fingerprint identification module located under the display component achieves under-screen fingerprint identification by capturing and detecting this returned light. The fingerprint identification module may be designed to achieve desired optical imaging by properly configuring an optical element for capturing and detecting returned light so that fingerprint information of the finger is detected.

Correspondingly, the in-screen fingerprint identification technology refers to mounting a fingerprint identification module or a part of a fingerprint identification module inside a display screen, so as to achieve a fingerprint identification operation in a display region of the display screen without setting a fingerprint capturing region in a region other than the display region on a front face of an electronic device.

Figure 1:
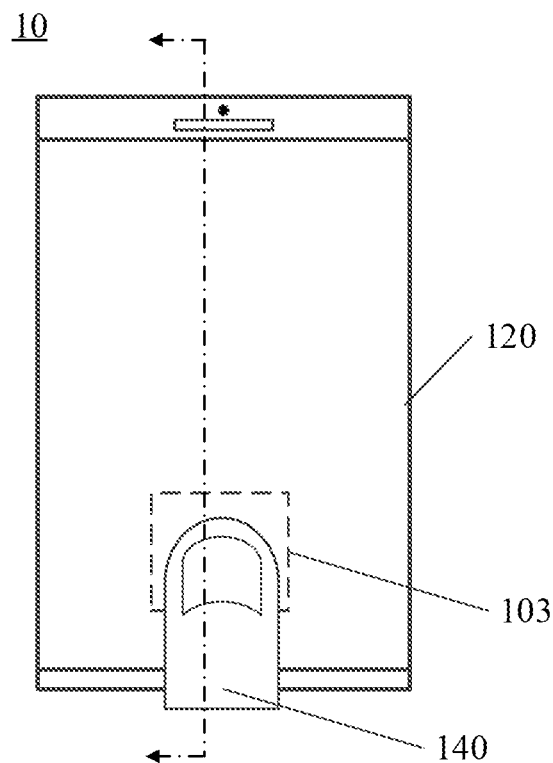
FIG. 1 is a schematic structural diagram of an electronic device to which the present application is applicable.
Figure 2:
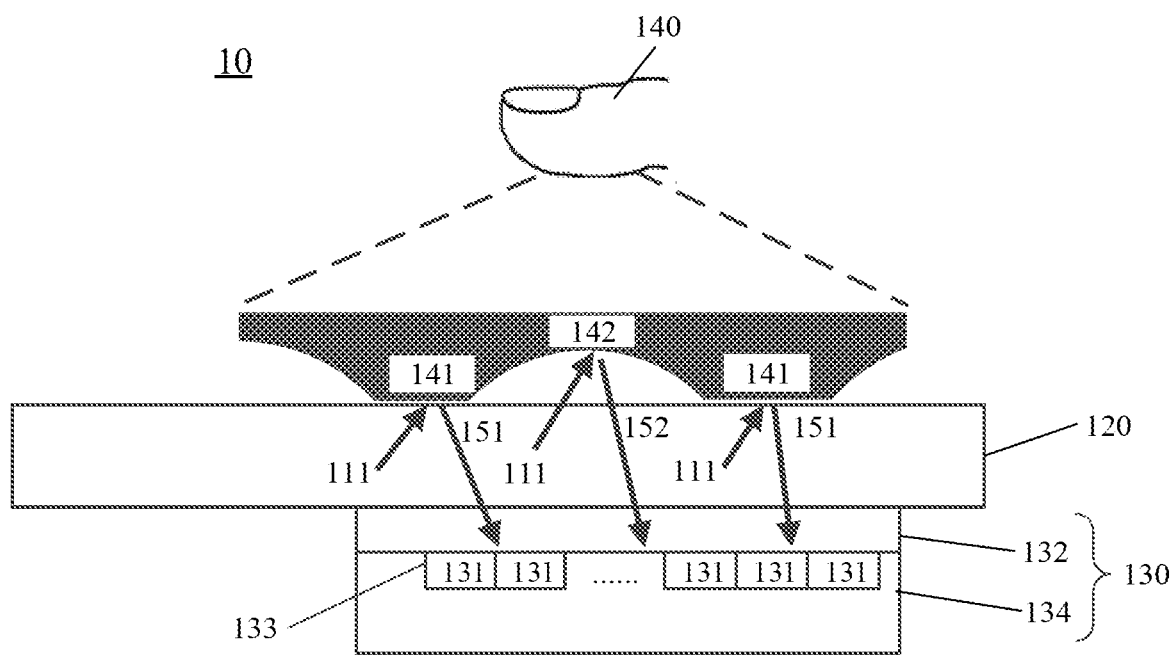
FIG. 2 is a schematic cross-sectional view of the electronic device shown in FIG. 1.
Figure 3:
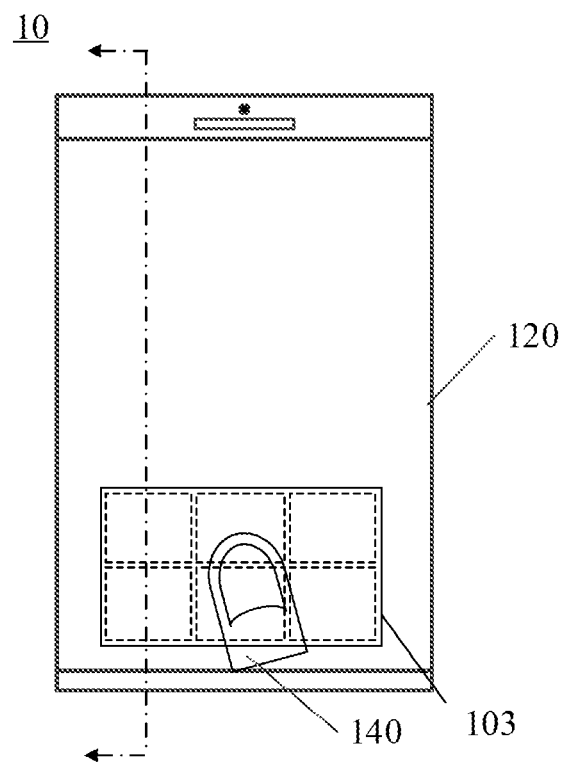
FIG. 3 is another schematic structural diagram of an electronic device to which the present application is applicable.
Figure 4:
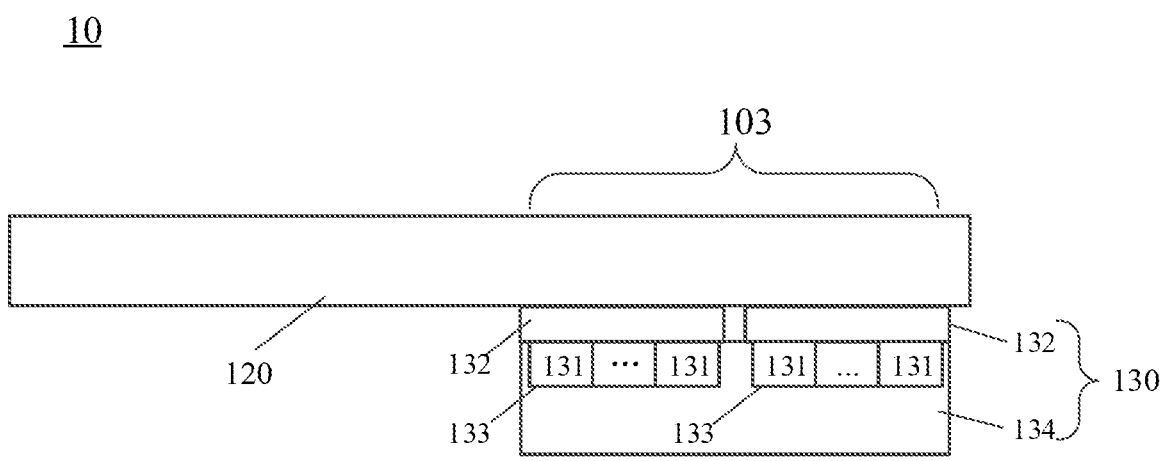
FIG. 4 is a schematic cross-sectional view of the electronic device shown in FIG. 3.

FIG. 1 to FIG. 4 illustrate schematic diagrams of an electronic device to which the embodiments of the present application are applicable. FIG. 1 and FIG. 3 are schematic oriented diagrams of an electronic device 10; and FIG. 2 and FIG. 4 are schematic cross-sectional views of the electronic device 10 shown in FIG. 1 and FIG. 3, respectively.

With reference to FIG. 1 to FIG. 4, the electronic device 10 may include a display screen 120 and an optical fingerprint identification module 130.

The display screen 120 may be a self-light-emitting display screen that adopts a self-light-emitting display unit as a display pixel. For example, the display screen 120 may be an organic light-emitting diode (OLED) display screen or a micro light-emitting diode (Micro-LED) display screen. In other alternative embodiments, the display screen 120 may also be a liquid crystal display (LCD) screen or other passive light-emitting display screens, which is not limited in the embodiments of the present application. Further, the display screen 120 may specifically be a touch display screen, which may not only display an image, but also detect a touch or press operation of a user, thereby providing the user with a human-machine interaction interface. For example, in one embodiment, the electronic device 10 may include a touch sensor, and the touch sensor may specifically be a touch panel (TP), which may be disposed on a surface of the display screen 120, or may be partially integrated or entirely integrated into an interior of the display screen 120 to form the touch display screen.

The optical fingerprint module 130 includes an optical fingerprint sensor that includes a sensing array 133 having a plurality of optical sensing units 131 (which may also be referred to as optical sensing pixels, photosensitive pixels, pixel units, or the like). A region where the sensing array 133 is located or a sensing region of the sensing array 133 is a fingerprint detecting region 103 (which is also referred to as a fingerprint capturing region, a fingerprint identification region, or the like) of the optical fingerprint module 130. For example, the optical sensing units 131 may be photo detectors, that is, the sensing array 133 may specifically be a photo detector array including a plurality of photo detectors distributed in an array.

The optical fingerprint module 130 is disposed in a partial region under the display screen 120.

With continuing reference to FIG. 1, the fingerprint detecting region 103 may be located in a display region of the display screen 120. In an alternative embodiment, the optical fingerprint module 130 may also be disposed at another position, such as a side of the display screen 120 or an non-light-transmitting region of an edge of the electronic device 10, and a light signal from at least part of the display region of the display screen 120 is directed to the optical fingerprint module 130 through a light path design, so that the fingerprint detecting region 103 is actually located in the display region of the display screen 120.

For the electronic device 10, when a user needs to unlock the electronic device 10 or perform other fingerprint verification, a fingerprint input can be achieved merely by pressing a finger against the fingerprint detecting region 103 in the display screen 120. Since fingerprint detection can be achieved in the screen, there is no need to reserve space for a front face of the electronic device 10 in the foregoing structure to set a fingerprint button (such as a Home button), so that a full screen scheme can be adopted; that is, the display region of the display screen 120 can be substantially extended to the entire front face of the electronic device 10.

With continuing reference to FIG. 2, the optical fingerprint module 130 may include a light detecting portion 134 and an optical component 132. The light detecting portion 134 includes the sensing array 133 (which may also be referred to as an optical fingerprint sensor), a readout circuit and other auxiliary circuits electrically connected to the sensing array 133, and may be fabricated on a die by a semiconductor process, such as an optical imaging chip or an optical fingerprint sensor. The optical component 132 may be disposed above the sensing array 133 of the light detecting portion 134, and may specifically include a filter layer, a light directing layer or a light path directing structure, and other optical elements. The filter layer may be configured to filter out ambient light penetrating a finger, and the light directing layer or light path directing structure is mainly configured to direct reflected light reflected from a finger surface to the sensing array 133 for optical detection.

In some embodiments of the present application, the optical component 132 and the light detecting portion 134 may be encapsulated in the same optical fingerprint member. For example, the optical component 132 and the optical detecting portion 134 may be encapsulated in the same optical fingerprint chip, or the optical component 132 may be disposed outside a chip where the optical detecting portion 134 is located, for example, the optical component 132 is attached above the chip, or some elements of the optical component 132 are integrated into the foregoing chip.

In some embodiments of the present application, a region where the sensing array 133 of the optical fingerprint module 130 is located or an optical sensing range of the sensing array 133 of the optical fingerprint module 130 corresponds to the fingerprint detecting region 103 of the optical fingerprint module 130. An area of the fingerprint capturing region 103 of the optical fingerprint module 130 may be equal to or not equal to an area of the region where the sensing array 133 of the optical fingerprint module 130 is located or the optical sensing range of the sensing array 133 of the optical fingerprint module 130, which is not specifically limited in the embodiment of the present application.

For example, a light path is directed by means of light collimation, and the area of the fingerprint detecting region 103 of the optical fingerprint module 130 may be designed to be substantially identical with the area of the sensing array of the optical fingerprint module 130.

For another example, the area of the fingerprint detecting region 103 of the optical fingerprint module 130 may be larger than the area of the sensing array 133 of the optical fingerprint module 130 through for example, a lens imaging light path design, a reflective folding light path design or other light path designs such as light convergence or reflection.

A light path directing structure that the optical component 132 may include will be exemplarily described below.

In an example that the light path directing structure adopts an optical collimator having an array of through holes with a high aspect ratio, the optical collimator may specifically be a collimator layer fabricated on a semiconductor silicon wafer, which has a plurality of collimating units or micro holes, and the collimating units may specifically be small holes. Among reflected light reflected back from a finger, light that is vertically incident to the collimating unit may pass through the collimating unit and be received by a sensor chip under the collimating unit, and light with an overlarge incident angle is attenuated through multiple reflections inside the collimating unit. Therefore, each sensor chip may basically only receive reflected light reflected back from a fingerprint line right above the sensor chip, which could effectively improve image resolution and then improve a fingerprint identification effect.

In an example that the light path directing structure adopts a light path design of an optical lens, the light path directing structure may be an optical lens layer having one or more lens units, for example, a lens group composed of one or more aspheric lenses, for converging reflected light reflected back from a finger to the sensing array 133 of the light detecting portion 134 under the optical lens layer, so that the sensing array 133 may perform imaging based on the reflected light so as to obtain a fingerprint image of the finger. Further, the optical lens layer may further be provided with a pinhole or a micro hole diaphragm formed in a light path of the lens unit. For example, one or more light blocking sheets may be provided in the light path of the lens unit, where at least one light blocking sheet may be provided with a light-transmitting micro hole formed in an optical axis or an optical center area of the lens unit, and the light-transmitting micro hole may serve as the foregoing pinhole or micro hole diaphragm. The pinhole or micro hole diaphragm may cooperate with the optical lens layer and/or another optical film layer above the optical lens layer and expand the field of view of the optical fingerprint module 130 to improve a fingerprint imaging effect of the optical fingerprint module 130.

In an example that the light path directing structure adopts a light path design of a micro lens layer, the light path directing structure may be a micro lens array formed by a plurality of micro lenses, which may be provided above the sensing array 133 of the light detecting portion 134 by a semiconductor growth process or other processes, and each micro lens may correspond to one of the sensing units in the sensing array 133. Moreover, another optical film layer such as a medium layer or a passivation layer may be provided between the micro lens layer and the sensing units. More specifically, a light shielding layer (or referred to as a light blocking layer, a light resisting layer, or the like) having micro holes (or referred to as openings) may further be provided between the micro lens layer and the sensing units, where a micro hole is provided between a corresponding micro lens and a corresponding sensing unit, and the light shielding layer may shield optical interference between adjacent micro lenses and sensing units so that light corresponding to the sensing unit is converged to an interior of the micro hole by the micro lens and transmitted to the sensing unit via the micro hole for optical fingerprint imaging.

It should be understood that the forgoing several implementations for a light path directing structure may be used alone or in combination.

For example, a micro lens layer may be further disposed above or under the collimator layer or the optical lens layer. Certainly, when the collimator layer or the optical lens layer is used in combination with the micro lens layer, the specific laminated structure or light path may require to be adjusted according to actual needs.

On the other hand, the optical component 132 may further include other optical elements, for example, a filter layer or other optical films, which may be disposed between the light path directing structure and the optical fingerprint sensor or between the display screen 120 and the light path directing structure, and are mainly configured to isolate the impact of external interference light on optical fingerprint detection. The filter layer may be configured to filter out ambient light that penetrates a finger and enters into the optical fingerprint sensor via the display screen 120. Similar to the light path directing structure, the filter layer may be respectively configured for each optical fingerprint sensor to filter out interference light, or a filter layer with a large area may be adopted to cover a plurality of optical fingerprint sensors simultaneously.

The fingerprint identification module 130 may be configured to capture fingerprint information (such as fingerprint image information) of a user.

The following is described by an example that the display screen 120 adopts a display screen with a self-light-emitting display unit, for example, an organic light-emitting diode (OLED) display screen or a micro light-emitting diode (Micro-LED) display screen. The optical fingerprint module 130 may use a display unit (that is, an OLED light source) of the OLED display screen 120 located in the fingerprint detecting region 103 as an excitation light source for optical fingerprint detection. When a finger 140 is pressed against the fingerprint detecting region 103, the display screen 120 emits a beam of light 111 to the target finger 140 above the fingerprint detecting region 103, and the light 111 is reflected by a surface of the finger 140 to form reflected light or scattered inside the finger 140 to form scattered light (transmissive light). In related patent applications, the foregoing reflected light and scattered light are collectively referred to as reflected light for convenience of description. Since a ridge 141 and a valley 142 of a fingerprint have different light reflecting capabilities, reflected light 151 from the ridge of the fingerprint and reflected light 152 from the valley of the fingerprint have different light intensities. After passing through the optical component 132, the reflected light is received by the sensing array 133 in the optical fingerprint module 130 and converted into a corresponding electrical signal, that is, a fingerprint detecting signal; and fingerprint image data may be obtained based on the fingerprint detecting signal, and fingerprint matching verification may be further performed, thereby achieving an optical fingerprint identification function in the electronic device 10.

In other alternative solutions, the optical fingerprint module 130 may also use an internal light source or an external light source to provide a light signal for fingerprint detection and identification. In this case, the optical fingerprint module 130 can not only apply to a self-light-emitting display screen such as an OLED display screen, but also apply to a non-self-light-emitting display screen such as a liquid crystal display screen or another passive light-emitting display screen.

In an example of a liquid crystal display screen having a backlight module and a liquid crystal panel, in order to support under-screen fingerprint detection of the liquid crystal display screen, an optical fingerprint system of the electronic device 10 may further include an excitation light source for optical fingerprint detection. The excitation light source may specifically be an infrared light source or a light source of non-visible light at a specific wavelength, which may be disposed under the backlight module of the liquid crystal display screen or disposed in an edge area under a protective cover of the electronic device 10. The optical fingerprint module 130 may be disposed under the liquid crystal panel or an edge area of the protective cover, and by being directed over a light path, light for fingerprint detection may reach the optical fingerprint module 130. Alternatively, the optical fingerprint module 130 may also be disposed under the backlight module, and the backlight module allows the light for fingerprint detection to pass through the liquid crystal panel and the backlight module and reach the optical fingerprint module 130 by drilling an opening on film layers such as a diffusion sheet, a brightening sheet, a reflection sheet or the like, or by performing other optical designs. When the optical fingerprint module 130 uses an internal light source or an external light source to provide a light signal for fingerprint detection, a detection principle is consistent with the foregoing description.

In a specific implementation, the electronic device 10 may further include a transparent protective cover; and the cover may be a glass cover or a sapphire cover, which is located above the display screen 120 and covers a front face of the electronic device 10. Therefore, in the embodiment of the present application, the so-called finger being pressed against the display screen 120 actually refers to the finger being pressed against the cover above the display screen 120 or a surface of a protective layer covering the cover.

On the other hand, the optical fingerprint module 130 may only include one optical fingerprint sensor, and in this case, the fingerprint detecting region 103 of the optical fingerprint module 130 has a smaller area and a fixed position, and therefore, when an fingerprint input is performed, the user needs to press the finger at a specific position of the fingerprint detecting region 103, otherwise the optical fingerprint module 130 may not be able to capture a fingerprint image, thereby resulting in poor user experience. In other alternative embodiments, the optical fingerprint module 130 may specifically include a plurality of optical fingerprint sensors. The plurality of optical fingerprint sensors may be disposed under the display screen 120 side by side in a splicing manner, and sensing regions of the plurality of optical fingerprint sensors collectively constitute the fingerprint detecting region 103 of the optical fingerprint module 130. Thus the fingerprint detecting region 103 of the optical fingerprint module 130 may extend to a main region of a lower half part of the display screen, that is, to a region generally pressed against by the finger, thereby achieving a blind pressing type of fingerprint input operation. Further, when the number of the optical fingerprint sensors is sufficient, the fingerprint detecting region 103 may also extend to a half of the display region or even the entire display region, thereby achieving half-screen or full-screen fingerprint detection.

With reference to FIG. 3 and FIG. 4, an optical fingerprint module 130 in the electronic device 10 may include a plurality of optical fingerprint sensors, the plurality of optical fingerprint sensors may be disposed under a display screen 120 side by side in a splicing manner or the like for example, and sensing regions of the plurality of optical fingerprint sensors collectively constitute a fingerprint detecting region 103 of the optical fingerprint module 130.

Further, the optical component 132 may include a plurality of light path directing structures, and each light path directing structure respectively corresponds to one optical fingerprint sensor (that is, a sensing array 133) and is respectively attached above a corresponding optical fingerprint sensor. Alternatively, the plurality of optical fingerprint sensors may also share an entire light path directing structure, that is, the light path directing structure has an area large enough to cover sensing arrays of the plurality of optical fingerprint sensors.

In an example that the optical component 132 adopts an optical collimator having an array of through holes with a high aspect ratio, when the optical fingerprint module 130 includes a plurality of optical fingerprint sensors, one or more collimating units may be configured for one optical sensing unit in an optical sensing array of each optical fingerprint sensor, and attached above a corresponding optical sensing unit. Certainly, a plurality of optical sensing units may also share one collimating unit, that is, the one collimating unit has a sufficiently large aperture to cover the plurality of optical sensing units. Since one collimating unit may correspond to a plurality of optical sensing units or one optical sensing unit corresponds to a plurality of collimating units, and a correspondence between a spatial period of the display screen 120 and a spatial period of the optical fingerprint sensors is broken, even if a spatial structure of a light-emitting display array of the display screen 120 and a spatial structure of the optical sensing array of the optical fingerprint sensor are similar, it could be effectively avoided that the optical fingerprint module 130 uses a light signal passing through the display screen 120 to perform fingerprint imaging to generate Moire fringes, and the fingerprint identification effect of the optical fingerprint module 130 is effectively improved.

In an example that the optical component 132 adopts an optical lens, when the optical fingerprint module 130 includes a plurality of sensor chips, one optical lens may be configured for each of the sensor chips for fingerprint imaging, or one optical lens may be configured for the plurality of sensor chips to achieve light convergence and fingerprint imaging. Even when one sensor chip has dual sensing arrays (Dual Array) or multiple sensing arrays (Multi-Array), two or more optical lenses may be configured for this sensor chip to cooperate with the dual sensing arrays or the multiple sensing arrays for optical imaging, so as to reduce an imaging distance and enhance the imaging effect.

It should be understood that FIGS. 1 to 4 are only examples of the present application and should not be understood as limitation to the present application.

For example, the present application does not specifically limit the number, size, and arrangement of the fingerprint sensors, which can be adjusted according to actual needs. For example, the optical fingerprint module 130 may include a plurality of fingerprint sensors distributed in a square or a circle.

It should be noted that, assuming that an optical directing structure that the optical component 132 includes is an optical collimator or a micro lens array, the effective field of view of the sensing array 133 of the optical fingerprint module 130 is limited by an area of the optical component. In an example of a micro lens array, in a general design, the micro lens array is located right above or obliquely above the sensing array 133, and one micro lens corresponds to one optical sensing unit, that is, each micro lens in the micro lens array focuses received light on an optical sensing unit corresponding to the same micro lens. Therefore, the fingerprint identification region of the sensing array 133 is affected by the size of the micro lens array.

Therefore, how to improve a region for fingerprint identification has become an urgent technical problem to be solved.

Figure 5:
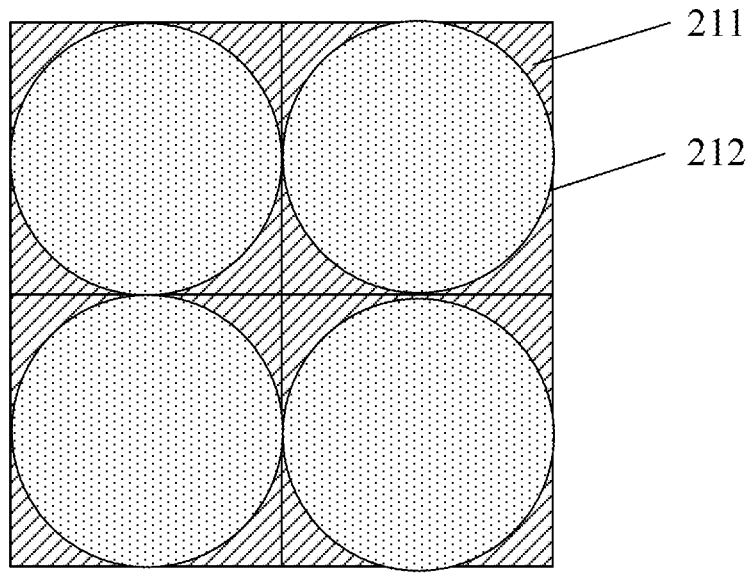

A fingerprint detection apparatus according to the embodiments of the present application is applied under a display screen to implement under-screen optical fingerprint detection. The fingerprint detection apparatus may be applicable to the electronic device 10 shown in FIG. 1 to FIG. 4, or the apparatus may be the optical fingerprint module 130 shown in FIG. 1 to FIG. 5. As shown in FIG. 5, the fingerprint detection apparatus includes a plurality of fingerprint detecting units 21.

It should be understood that the fingerprint detection apparatus may include a plurality of fingerprint detecting units distributed in an array or arranged in a staggered manner, or may include a plurality of fingerprint detecting units distributed in a central symmetric or axisymmetric manner, which is not specifically limited in the embodiment of the present application.

Each of the plurality of fingerprint detecting units includes: a plurality of optical sensing pixels, at least one micro lens and at least one light shielding layer.

In a specific implementation, the at least one micro lens may be disposed above the plurality of optical sensing pixels; and the at least one light shielding layer may be disposed between the at least one micro lens and the plurality of optical sensing pixels, and each of the at least one light shielding layer is provided with an opening corresponding to the plurality of optical sensing pixels. Oblique light signals in multiple directions reflected from a finger above the display screen are respectively transmitted to the plurality of optical sensing pixels through the opening provided in the at least one light shielding layer after being converged by the at least one micro lens, and the oblique light signals are used to detect fingerprint information of the finger.

The oblique light signals in the multiple directions may be incident directions of oblique light with respect to the at least one micro lens. For example, the at least one micro lens may be regarded as a whole; and in this case, the multiple directions may be oblique light signals incident into the at least one micro lens from four directions of front, back, left and right in a top view, and included angles of the oblique light signals in these four directions with respect to a plane where the display screen is located may be the same or different. The multiple directions may be directions of the oblique light signals in these four directions with respect to the plane where the display screen is located, or directions with respect to stereoscopic space. The multiple directions may be different from each other, or may be partially different.

The micro lens may be various lenses with a convergence function for increasing a field of view and increasing an amount of light signals transmitted to photosensitive pixels. A material of the micro lens may be an organic material such as resin.

The optical sensing pixel may be a photoelectric sensor configured to convert a light signal into an electrical signal. Optionally, the optical sensing pixel may adopt a complementary metal oxide semiconductor (CMOS) device, that is, a semiconductor device composed of a PN junction, and has a unidirectional conductive characteristic. Optionally, the optical sensing pixel has a light sensitivity greater than a first predetermined threshold and quantum efficiency greater than a second predetermined threshold for blue light, green light, red light, or infrared light. For example, the first predetermined threshold may be 0.5 v/lux-sec and the second predetermined threshold may be 40%. That is, the photosensitive pixel has a higher light sensitivity and higher quantum efficiency for blue light (at a wavelength of 460±30 nm), green light (at a wavelength of 540±30 nm), red light or infrared light (at a wavelength greater than or equal to 610 nm) to facilitate detection of corresponding light.

It should be understood that the embodiment of the present application does not limit the specific shapes of the micro lens and the optical sensing pixel. For example, each of the plurality of optical sensing pixels may be a polygonal pixel such as a quadrilateral or hexagonal pixel, or may be a pixel in another shape, such as a circular pixel, so that the plurality of optical sensing pixels have higher symmetry, higher sampling efficiency, equidistance for adjacent pixels, better angular resolution, and less aliasing effect.

It should also be understood that the foregoing parameters for the photosensitive pixel may correspond to light required for fingerprint detection. For example, if the light required for fingerprint detection is only light in a wave band, the foregoing parameters for the photosensitive pixel only need to meet requirements of the light in this wave band.

In the embodiment of the present application, signals received by the plurality of optical sensing pixels are oblique light signals in multiple directions, that is, light signals in multiple directions obliquely incident.

When contact between a fingerprint of a dry finger and an OLED screen is bad, contrast of a fingerprint image between a fingerprint ridge and a fingerprint valley in a vertical direction is poor, and the image is too blurred to distinguish the fingerprint lines. According to the present application, a fingerprint image of the dry finger can be detected better while normal finger fingerprints can be acquired better by using a reasonable light path design to allow a light path to receive oblique light signals. In a normal life scene, for example, in a scene such as after washing hands, getting up in the morning, wiping dust with a finger, or at a low temperature, the finger is usually dry, the cuticle is uneven, and when the finger is pressed against the OLED screen, poor contact may occur in some regions of the finger. The occurrence of this case causes a bad effect of the current optical fingerprint solution on fingerprint identification for a dry hand, and the beneficial effect of the present application is to improve a fingerprint imaging effect of a dry hand and make a fingerprint image of the dry hand clear.

In addition, by performing non-directly facing light imaging (that is, oblique light imaging) on the oblique light signals in the multiple directions by the at least one micro lens, a thickness of a light path design (that is, the at least one light shielding layer) of the optical sensing pixel array can be shortened, finally reducing a thickness of the fingerprint detection apparatus effectively. Meanwhile, by imaging the oblique light signals in the multiple directions, an object space numerical aperture of an optical system can be expanded, thereby improving robustness and tolerance of the fingerprint detection apparatus. The numerical aperture may be used to measure an angular range of light that can be captured by the at least one micro lens. In other words, the plurality of optical sensing pixels can further expand an angle of the field of view and the field of view of the fingerprint detecting unit by receiving light signals in multiple directions, thereby increasing an angle of the field of view and the field of view of the fingerprint detection apparatus. For example, the field of view of the fingerprint detection apparatus may be expanded from 6×9 $mm^2$ to 7.5×10.5 $mm^2$, which further improves the fingerprint identification effect.

Moreover, by disposing a plurality of optical sensing pixels under the at least one micro lens, when the number of the at least one micro lens is not equal to the number of the plurality of optical sensing pixels, a spatial period of a micro lens (that is, spacing between adjacent micro lenses) is not equal to a spatial period of an optical sensing pixel (that is, spacing between adjacent optical sensing pixels), thereby avoiding the occurrence of Moire fringes in a fingerprint image and improving the fingerprint identification effect. Particularly, when the number of the at least one micro lens is less than the number of the plurality of optical sensing pixels, the costs of the lens can be reduced and the density of the plurality of optical sensing pixels can be increased, thereby reducing the size and costs of the fingerprint detection apparatus.

Meanwhile, light signals in multiple directions may be multiplexed by a single fingerprint detecting unit (for example, light signals at four angles may be multiplexed by a single micro lens), and segmentation imaging may be performed on light beams at different object space aperture angles, which improves an amount of entering light of the fingerprint detection apparatus effectively, and thus reduces an exposure duration of time of the optical sensing pixels.

Moreover, since the plurality of optical sensing pixels can respectively receive oblique light signals from multiple directions, the plurality of optical sensing pixels may be divided into a plurality of optical sensing pixel groups according to the directions of the oblique light signals, the plurality of optical sensing pixel groups may be respectively configured to receive the oblique light signals in the multiple directions, that is, each optical sensing pixel group may generate a fingerprint image based on received oblique light signals, and thus the plurality of optical sensing pixel groups may be configured to generate a plurality of fingerprint images. In this case, the plurality of fingerprint images may be superimposed to obtain a fingerprint image with high resolution, and then fingerprint identification is performed based on the fingerprint image with the high resolution, which can improve fingerprint identification performance.

Based on the above analysis, it can be seen that oblique light signals in multiple directions reflected from a finger above the display screen are respectively transmitted to the plurality of optical sensing pixels through an opening provided in the at least one light shielding layer after being converged by the at least one micro lens, which can not only reduce an exposure duration of time of the plurality of optical sensing pixels and a thickness and costs of the fingerprint detection apparatus, but also improve robustness, tolerance, an angle of the field of view and the field of view of the fingerprint detection apparatus, and further improve a fingerprint identification effect, especially a fingerprint identification effect of a dry finger.

A fingerprint detecting unit of the embodiments of the present application will be described hereinafter with reference to the accompanying drawings.

In some embodiments of the present application, the number of the at least micro lens is equal to the number of the plurality of optical sensing pixels, where one micro lens is disposed above each of the plurality of optical sensing pixels.

For example, in one implementation manner, the at least one micro lens is a rectangular array of 2×2 micro lenses, the plurality of optical sensing pixels are a rectangular array of 2×2 optical sensing pixels, and one micro lens is disposed right above each optical sensing pixel in the rectangular array of 2×2 optical sensing pixels.

For another example, in one implementation manner, the at least one micro lens is a rectangular array of 2×2 micro lenses, the plurality of optical sensing pixels are a rectangular array of 2×2 optical sensing pixels, and one micro lens is disposed obliquely above each optical sensing pixel in the rectangular array of 2×2 optical sensing pixels.

As shown in FIG. 5, a fingerprint detecting unit 21 may include four optical sensing pixels 211 and four micro lenses 212 distributed in a rectangular array, where one micro lens 212 is disposed right above each optical sensing pixel 211.

Figure 6:
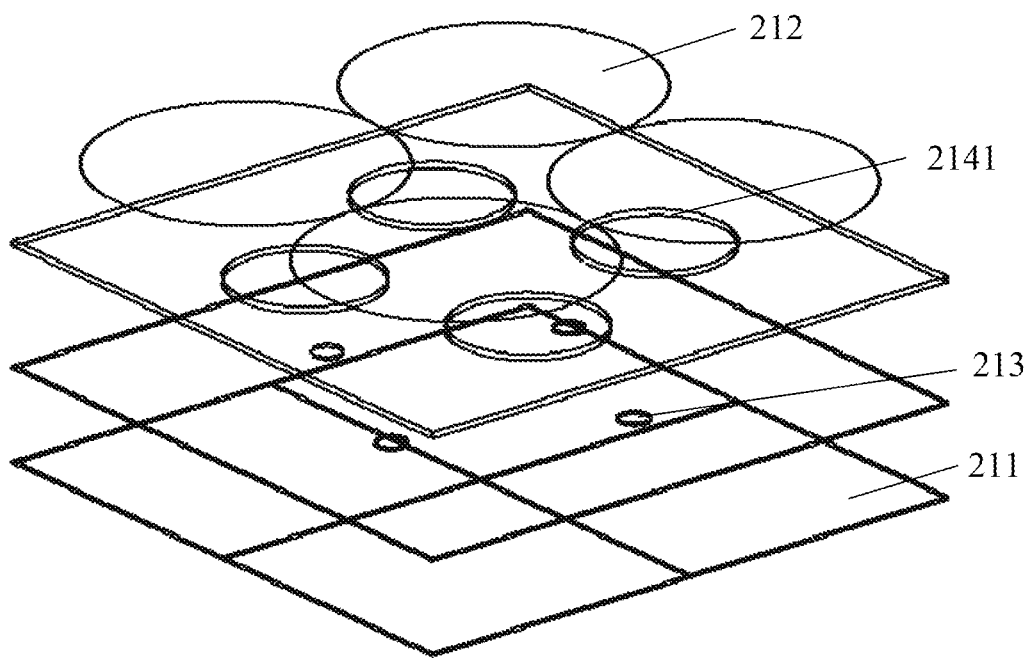

In this case, as shown in FIG. 6, the fingerprint detecting unit 21 may include a top light shielding layer and a bottom light shielding layer. The top light shielding layer may include four openings 2141 respectively corresponding to the four micro lenses 212, and the bottom light shielding layer may include four openings 213 respectively corresponding to the four micro lenses 212.

In one implementation, the rectangular array of 2×2 micro lenses receives the oblique light signals in the multiple directions in a clockwise direction, and each micro lens in the rectangular array of 2×2 micro lenses converges the received oblique light signals to an optical sensing pixel under an adjacent micro lens in the clockwise direction; or the rectangular array of 2×2 micro lenses receives the oblique light signals in the multiple directions in a counterclockwise direction, and each micro lens in the rectangular array of 2×2 micro lenses converges the received oblique light signals to an optical sensing pixel under an adjacent micro lens in the counterclockwise direction.

Figures 7, 8:
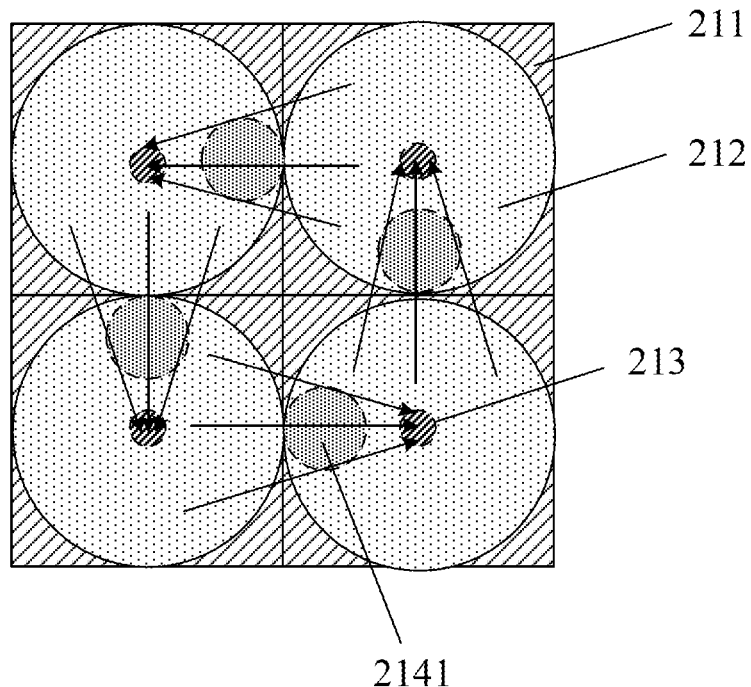

For example, as shown in FIG. 7, the four micro lenses 212 may converge oblique light signals in multiple directions respectively to the four optical sensing pixels 211 along the following paths:

the micro lens 212 at the upper right corner converges the received oblique light signals to the optical sensing pixel 211 at the upper left corner, the micro lens 212 at the upper left corner converges the received oblique light signals to the optical sensing pixel 211 at the lower left corner, the micro lens 212 at the lower left corner converges the received oblique light signals to the optical sensing pixel 211 at the lower right corner, and the micro lens 212 at the lower right corner converges the received oblique light signals to the optical sensing pixel 211 at the upper right corner.

Accordingly, when the fingerprint detection apparatus includes a plurality of fingerprint detecting units distributed in an array, a plurality of fingerprint images may be generated based on received light signals in multiple directions, and then a fingerprint image with high resolution is obtained to improve the fingerprint identification effect.

For example, a rectangular array of 4×4 fingerprint detecting units may include optical sensing pixel arrays as shown in FIG. 8, where "1" represents an optical sensing pixel for receiving an oblique light signal in a first direction, "2" represents an optical sensing pixel for receiving an oblique light signal in a second direction, "3" represents an optical sensing pixel for receiving an oblique light signal in a third direction, and "4" represents an optical sensing pixel for receiving an oblique light signal in a fourth direction. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

With reference to FIG. 7, the first direction may be a direction of an oblique light signal received by the micro lens 212 at the lower right corner, the second direction may be a direction of an oblique light signal received by the micro lens 212 at the upper right corner, the third direction may be a direction of an oblique light signal received by the micro lens 212 at the upper left corner, and the fourth direction may be a direction of an oblique light signal received by the micro lens 212 at the lower left corner.

Figure 9:
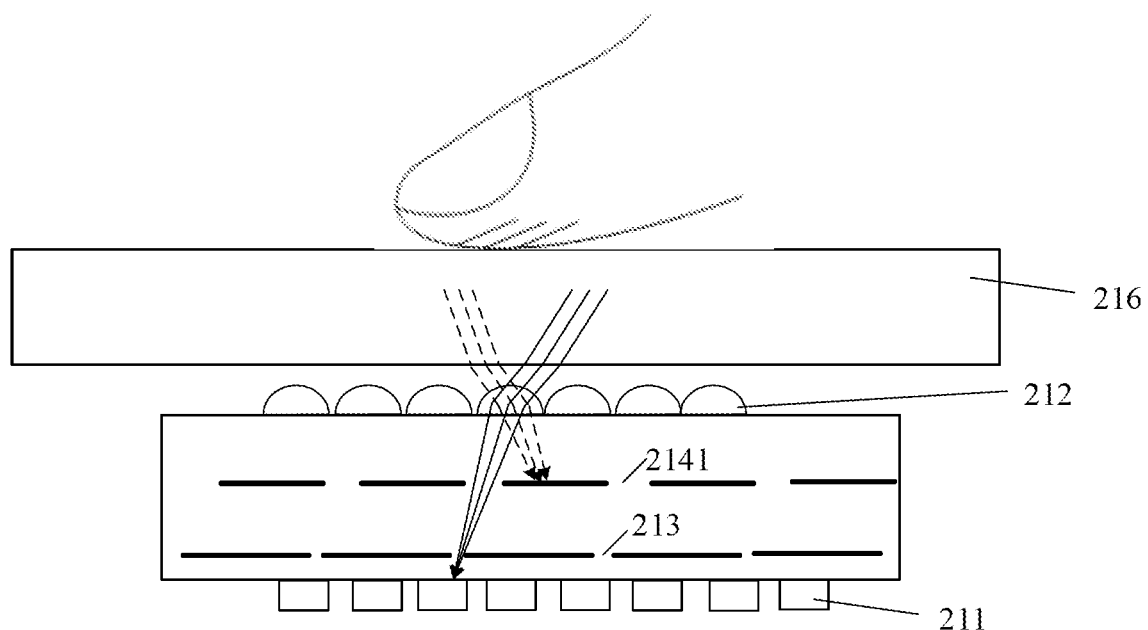

FIG. 9 is a side view of a fingerprint detection apparatus located under a display screen.

As shown in FIG. 9, the fingerprint detection apparatus may include micro lenses 212 distributed in an array, a top light shielding layer and a bottom light shielding layer located under the micro lenses 212, and optical sensing pixels distributed in an array located under the bottom light shielding layer, where for each micro lens 212, the top light shielding layer and the bottom light shielding layer are respectively provided with a corresponding opening 2141 and opening 213. The fingerprint detection apparatus is disposed under a display screen 216.

Each micro lens 212 converges received oblique light signals in specific directions (light signals shown by solid lines in the drawing) to a corresponding optical sensing pixel through a corresponding opening 2141 and opening 213, and transmits received oblique light signals in non-specific directions (light signals shown by dashed lines in the drawing) to regions of the light shielding layers other than the openings 2141 and the openings 214 to avoid that the received oblique light signals in the non-specific directions are received by other optical sensing pixels, thereby achieving segmentation imaging of a fingerprint image.

Figure 10:
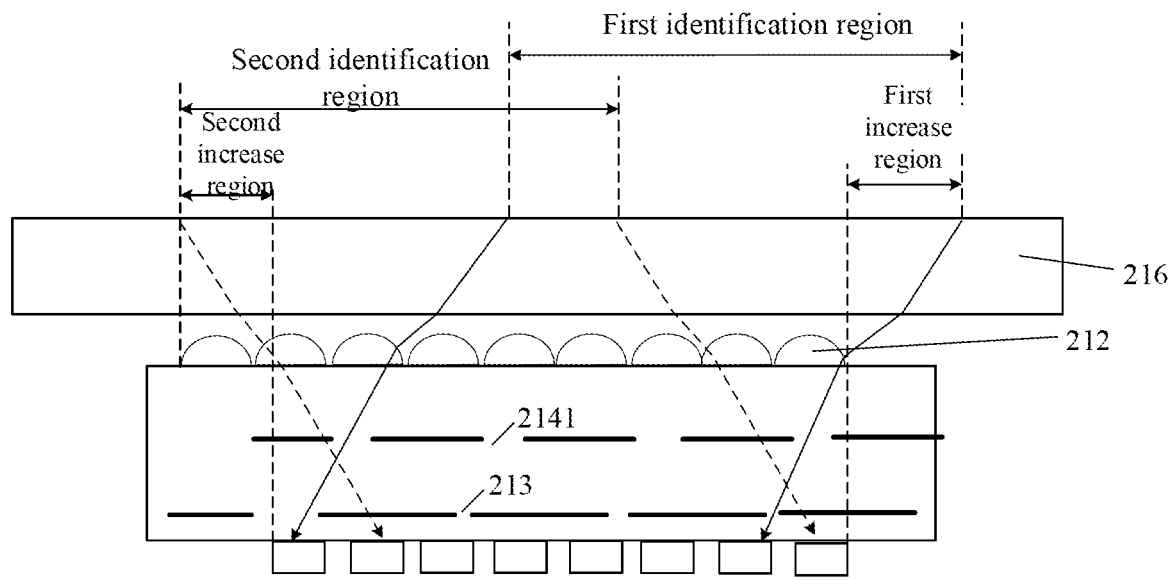

FIG. 10 is a schematic diagram of light paths for oblique light signals in two directions according to an embodiment of the present application.

With reference to FIG. 7, it is assumed that one micro lens 212 in the fingerprint detecting unit (for example, the micro lens 212 at the upper right corner shown in FIG. 7) converges a received oblique light signal (a light signal shown by a solid line in FIG. 10) in one direction (that is, the second direction) to a corresponding optical sensing pixel (for example, the optical sensing pixel 211 at the upper left corner shown in FIG. 7) through a corresponding opening 2141 and opening 213, and another micro lens 212 in the fingerprint detecting unit (for example, the micro lens 212 at the lower left corner shown in FIG. 7) converges a received oblique light signal (a light signal shown by a dashed line in FIG. 10) in another direction (that is, the fourth direction) to a corresponding optical sensing pixel (for example, the optical sensing pixel 211 at the lower right corner shown in FIG. 7) through a corresponding opening 2141 and opening 213.

For example, as shown in FIG. 10, a fingerprint identification region of the fingerprint detection apparatus including a plurality of fingerprint detecting units includes a first fingerprint identification region and a second fingerprint identification region, where a fingerprint identification region corresponding to the micro lens 212 for converging the oblique light signal in the second direction is the first fingerprint identification region, and a fingerprint identification region corresponding to the micro lens for converging the oblique light signal in the fourth direction is the second fingerprint identification region. The first fingerprint identification region is offset to right by a first increase region relative to an array formed by the optical sensing pixels, and the second fingerprint identification region is offset to left by a second increase region relative to the array formed by the optical sensing pixels.

In other words, relative to a fingerprint detection apparatus that only receives an oblique light signal in one direction, the fingerprint identification region of the fingerprint detection apparatus provided in the embodiment of the present application additionally include the first increase region and the second increase region, which effectively increases a visible region (that is, the field of view). In addition, an overlapping region between the first fingerprint identification region and the second fingerprint identification region could effectively improve image resolution of a fingerprint image, and further improve the fingerprint identification effect.

It should be understood that the light path design shown in FIG. 7 is only an example of the present application and should not be understood as limitation to the present application.

In another implementation, the rectangular array of 2×2 micro lenses receives the oblique light signals in the multiple directions in a diagonal direction of the rectangular array of 2×2 micro lenses, and each micro lens in the rectangular array of 2×2 micro lenses converges the received oblique light signals to an optical sensing pixel under an adjacent micro lens in the diagonal direction.

Figure 11:
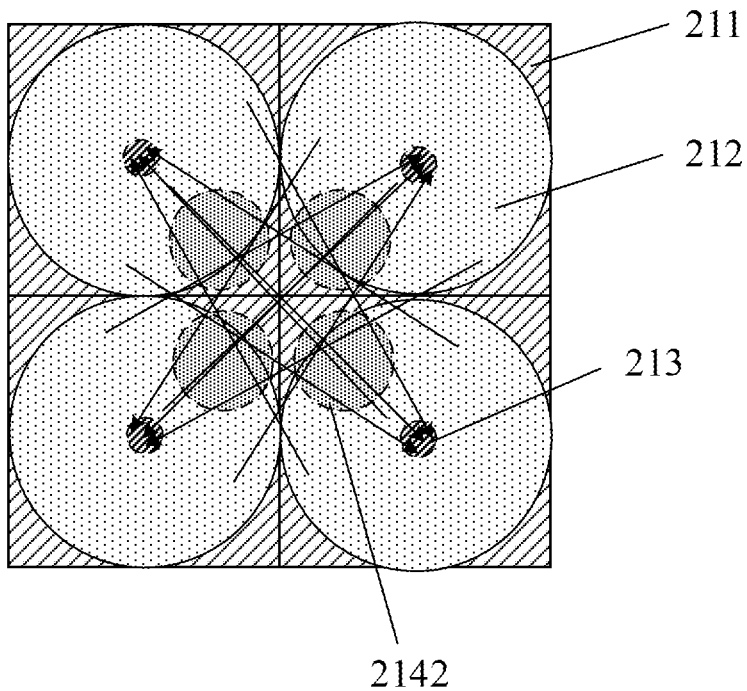
Figure 12:
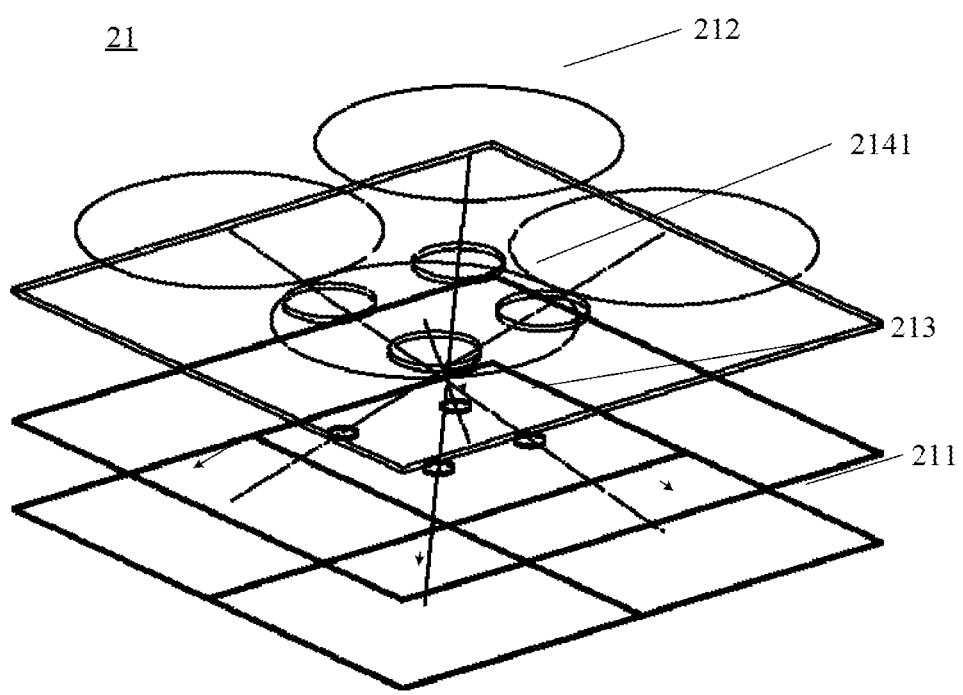

For example, as shown in FIG. 11 and FIG. 12, the four micro lenses 212 may converge oblique light signals in multiple directions respectively to the four optical sensing pixels 211 along the following paths:

the micro lens 212 at the upper right corner converges the received oblique light signals to the optical sensing pixel 211 at the lower left corner, the micro lens 212 at the lower left corner converges the received oblique light signals to the optical sensing pixel 211 at the upper right corner, the micro lens 212 at the upper left corner converges the received oblique light signals to the optical sensing pixel 211 at the lower right corner, and the micro lens 212 at the lower right corner converges the received oblique light signals to the optical sensing pixel 211 at the upper left corner.

Accordingly, when the fingerprint detection apparatus includes a plurality of fingerprint detecting units distributed in an array, a plurality of fingerprint images may be generated based on received light signals in multiple directions, and then a fingerprint image with high resolution is obtained to improve the fingerprint identification effect.

Similarly, a rectangular array of 4×4 fingerprint detecting units may include optical sensing pixel arrays as shown in FIG. 8, where "1" represents an optical sensing pixel for receiving an oblique light signal in a first direction, "2" represents an optical sensing pixel for receiving an oblique light signal in a second direction, "3 represents an optical sensing pixel for receiving an oblique light signal in a third direction, and "4" represents an optical sensing pixel for receiving an oblique light signal in a fourth direction. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

With reference to FIG. 11, the first direction may be a direction of an oblique light signal received by the micro lens 212 at the lower left corner, the second direction may be a direction of an oblique light signal received by the micro lens 212 at the lower right corner, the third direction may be a direction of an oblique light signal received by the micro lens 212 at the upper right corner, and the fourth direction may be a direction of an oblique light signal received by the micro lens 212 at the upper left corner.

It should be understood that, in the embodiment of the present application, the fingerprint detecting unit includes at least one light shielding layer and a plurality of optical sensing pixels, where each of the at least one light shielding layer is provided with an opening corresponding to the plurality of optical sensing pixels. For example, the at least one light shielding layer may be a plurality of light shielding layers, and a top light shielding layer of the plurality of light shielding layers may be provided with at least one opening corresponding to the plurality of optical sensing pixels. For example, the top light shielding layer of the plurality of light shielding layers may be provided with one opening corresponding to the plurality of optical sensing pixels. For another example, the top light shielding layer of the plurality of light shielding layers may be provided with a plurality of openings respectively corresponding to the plurality of optical sensing pixels.

For example, as shown in FIG. 12, the at least one light shielding layer may include a top light shielding layer and a bottom light shielding layer, where the top light shielding layer is provided with four openings 2141 respectively corresponding to four optical sensing pixels. The bottom light shielding layer is provided with four openings 213 respectively corresponding to the four optical sensing pixels.

Figure 13:
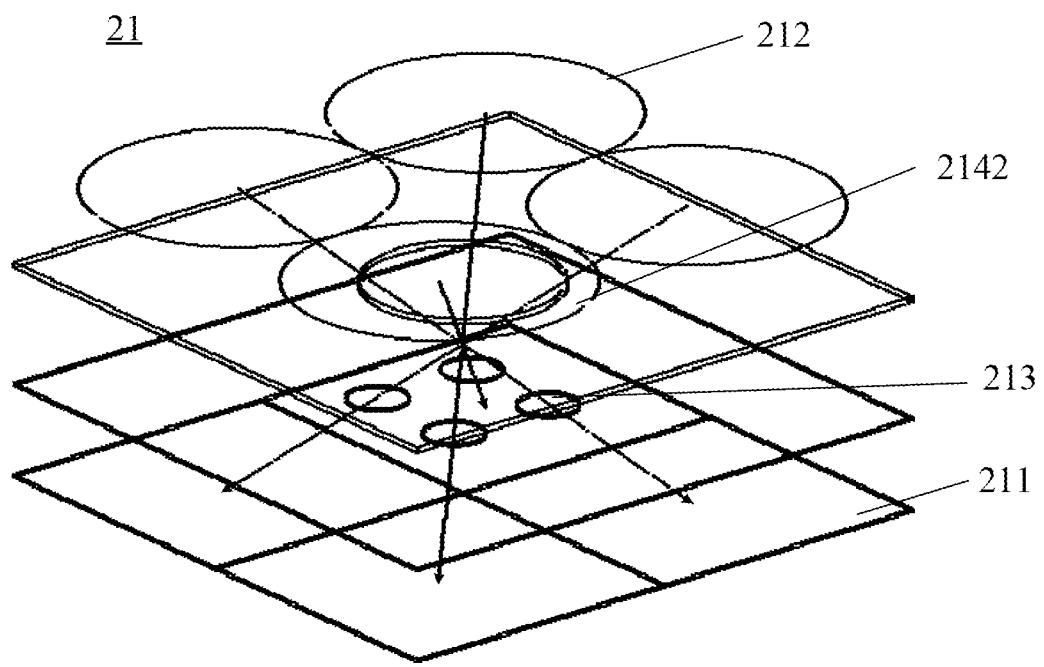

For example, as shown in FIG. 13, the at least one light shielding layer may include a top light shielding layer and a bottom light shielding layer, where the top light shielding layer is provided with one opening 2142 corresponding to four optical sensing pixels. The bottom light shielding layer is provided with four openings 213 respectively corresponding to the four optical sensing pixels.

It should be understood that the openings provided in the light shielding layers in FIG. 12 and FIG. 13 are described only by an example of the fingerprint detecting unit shown in FIG. 11, and the implementation manners thereof are applicable to various embodiments of the present application, which is not limited in the present application.

For example, the at least one light shielding layer may be light shielding layers more than 2 layers.

It should also be understood that FIG. 5 to FIG. 13 are only examples that one micro lens is disposed above each optical sensing pixel and should not be understood as limitation to the present application. For example, the fingerprint detecting unit may further include other numbers or other arrangements of micro lenses or optical sensing pixels.

For example, in another implementation manner, the at least one micro lens is multiple rows of micro lenses, and the plurality of optical sensing pixels are multiple rows of optical sensing pixels corresponding to the multiple rows of micro lenses, where each row of optical sensing pixels in the multiple rows of optical sensing pixels is disposed under a corresponding row of micro lenses in a dislocated manner.

Optionally, the multiple rows of micro lenses may be multiple columns or lines of micro lenses.

The at least one light shielding layer may be provided with a corresponding light path design so that the multiple rows of micro lenses receive the oblique light signals in the multiple directions in a dislocation direction of the multiple rows of optical sensing pixels, and each row of micro lenses in the multiple rows of micro lenses converges the received oblique light signals to optical sensing pixels under the same row of micro lenses or adjacent micro lenses.

Figure 14:
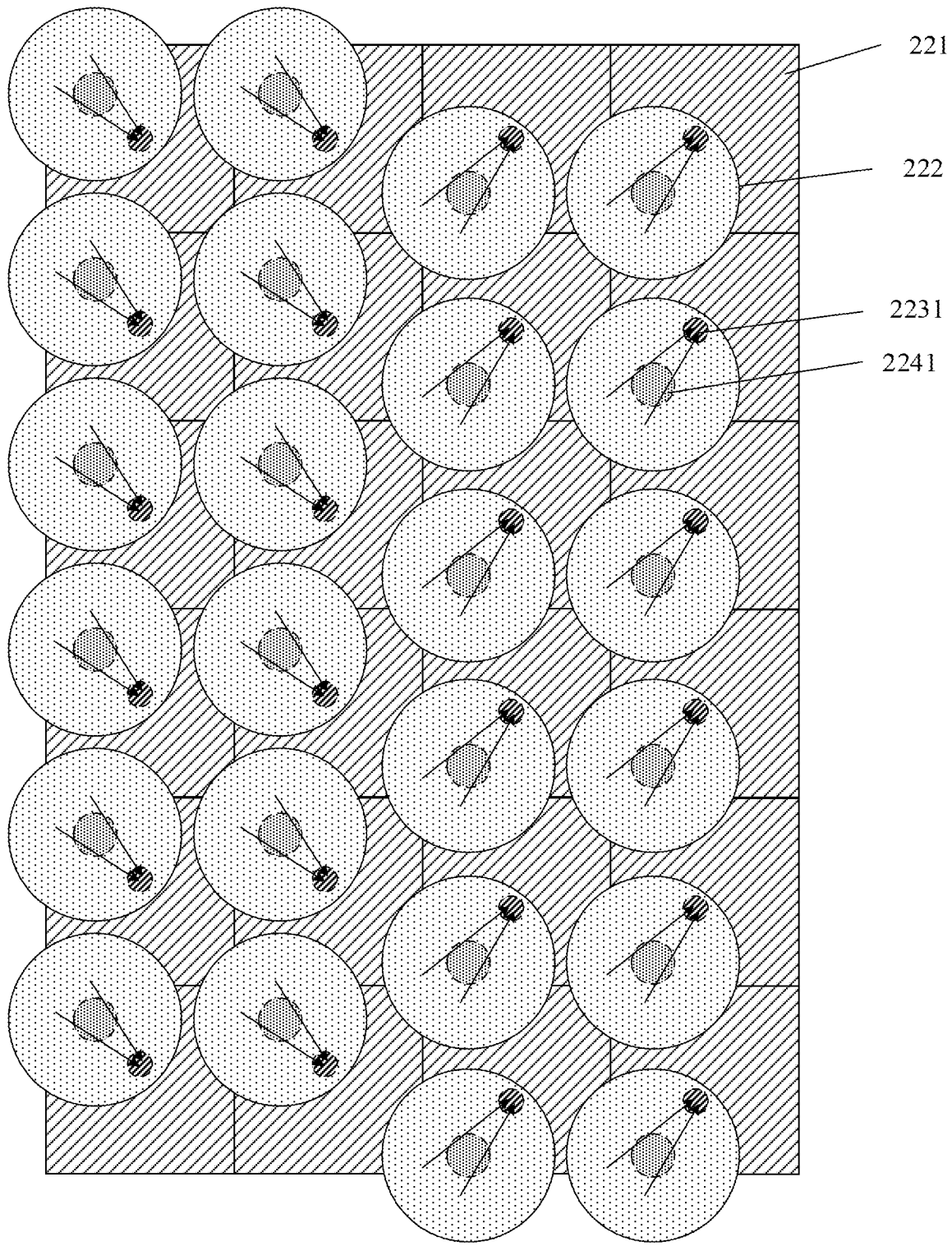

For example, as shown in FIG. 14, a fingerprint detecting unit 22 may include four columns of optical sensing pixels distributed in a rectangular array and four columns of micro lenses corresponding to the four columns of optical sensing pixels, where each column of optical sensing pixels in the four columns of optical sensing pixels includes six optical sensing pixels 211, each column of micro lenses in the four columns of micro lenses includes six micro lenses 222, and one optical sensing pixel 221 is disposed under one micro lens 222 in a dislocated manner.

For example, the fingerprint detecting unit 22 may include a top light shielding layer and a bottom light shielding layer. In this case, for each micro lens 222, the top light shielding layer and the bottom light shielding layer may be provided with a corresponding opening 2241 and opening 2231, respectively. Each micro lens 222 in each row of micro lenses in the multiple rows of micro lenses may converge received light signals to an optical sensing pixel 221 obliquely under the same micro lens 222 through a corresponding opening 2241 and opening 2231.

Accordingly, when the fingerprint detection apparatus includes a plurality of fingerprint detecting units distributed in an array, a plurality of fingerprint images may be generated based on received light signals in multiple directions, and then a fingerprint image with high resolution is obtained to improve the fingerprint identification effect.

Figure 15:
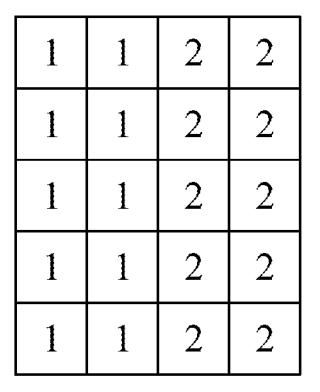

For example, the fingerprint detecting unit shown in FIG. 14 may include an optical sensing pixel array as shown in FIG. 15, where "1" represents an optical sensing pixel for receiving an oblique light signal in a first direction, and "2" represents an optical sensing pixel for receiving an oblique light signal in a second direction. That is, the optical sensing pixels represented by "1" and "2" each may be used to generate a fingerprint image, that is, a total of two fingerprint images may be generated, and these two fingerprint images may be used to merge into a fingerprint image with high resolution, thereby improving the identification effect of the fingerprint detection apparatus.

With reference to FIG. 11, based on an order from left to right, the first direction may be a direction of oblique light signals received by micro lenses in the first and second columns of micro lenses, and the second direction may be a direction of oblique light signals received by micro lenses in the third and fourth columns of micro lenses.

Optionally, in one embodiment of the present application, a projection of each micro lens in each row of micro lenses in the multiple rows of micro lenses on a plane where the display screen is located is a circle, and a projection of each optical sensing pixel in each row of optical sensing pixels in the multiple rows of optical sensing pixels on the plane where the display screen is located is a rectangle. A projection of a center of each optical sensing pixel in each row of optical sensing pixels in the multiple rows of optical sensing pixels on the plane where the display screen is located, relative to a projection of a center of a corresponding micro lens on the plane where the display screen is located, is offset by a preset distance in a dislocation direction of the multiple rows of optical sensing pixels, and the preset distance is less than or equal to a side length of the rectangle or a diameter of the circle.

For example, as shown in FIG. 14, the dislocation direction is a diagonal direction of each optical sensing pixel in each row of optical sensing pixels in the multiple rows of optical sensing pixels, that is, each optical sensing pixel 221 in each row of optical sensing pixels in the multiple rows of optical sensing pixels is offset by a preset distance in a diagonal direction of the same optical sensing pixel 221.

In this case, a corresponding opening 2241 and opening 2231 are disposed above each optical sensing pixel 221 in each row of optical sensing pixels in the multiple rows of optical sensing pixels, that is, at least one light shielding layer in the fingerprint detecting unit 22 is provided with a corresponding opening above each optical sensing pixel 221.

It should be understood that the preset distance may also be an offset distance in a direction where a side of the optical sensing pixel 221 is located, for example, two sides of the optical sensing pixel 221 are an X-axis direction and a Y-axis direction, where the preset distance may include an offset distance in the X-axis direction and an offset distance in the Y-axis direction. For example, assuming that a side length of the optical sensing pixel is 12.5 mm and a diameter of the micro lens is 11.5 mm, the offset distance in the X-axis direction may be 4~5 mm and the offset distance in the Y-axis direction may be 4~5 mm. Certainly, the foregoing parameters are merely examples and should not be understood as limitation to themselves. For example, the offset distance in the X-axis direction may be not equal to the offset distance in the Y-axis direction. For another example, the offset distance in the X-axis direction or the offset distance in the Y-axis direction may be greater than 5 mm or less than 4 mm.

Certainly, FIG. 14 is only an example of an offset of the multiple rows of optical sensing pixels in the embodiment of the present application, and should not be understood as limitation to the present application.

Figure 16:
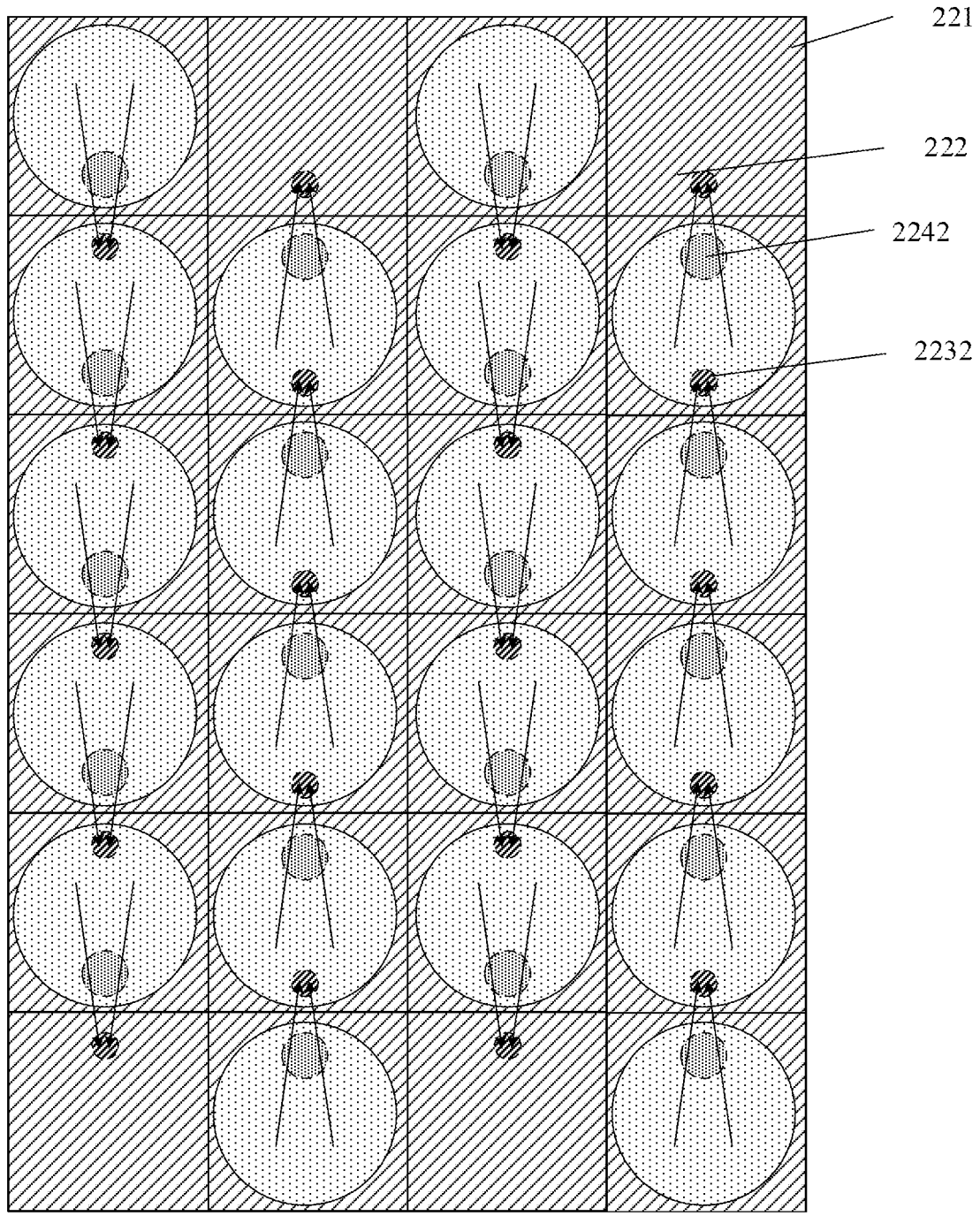

For example, as shown in FIG. 16, the dislocation direction is a direction where a vertical side of each optical sensing pixel in each row of optical sensing pixels in the multiple rows of optical sensing pixels is located. The vertical side may be a direction parallel to an arrangement direction of the optical sensing pixels.

For example, the fingerprint detecting unit 22 may include a top light shielding layer and a bottom light shielding layer. In this case, for each micro lens 222, the top light shielding layer and the bottom light shielding layer may be provided with a corresponding opening 2242 and opening 2232, respectively. Each micro lens 222 in each row of micro lenses in the multiple rows of micro lenses may converge received oblique light signals to an optical sensing pixel 221 right under an adjacent micro lens 222 through a corresponding opening 2242 and opening 2232. For example, the micro lens 222 at the upper left corner may converge received oblique light signals to an optical sensing pixel 221 right under an adjacent micro lens 222 in the first column and second line.

In this case, the bottom light shielding layer may be provided with a corresponding opening 2232 above each optical sensing pixel 221 in each row of optical sensing pixels in the multiple rows of optical sensing pixels, and the top light shielding layer may be provided with a corresponding opening 2242 above an optical sensing pixel 221 adjacent to the same optical sensing pixel 221.

Certainly, in other alternative embodiments, the dislocation direction may also be other directions. For example, the dislocation direction is a direction where a horizontal side of each optical sensing pixel in each row of optical sensing pixels in the multiple rows of optical sensing pixels is located. The horizontal side may be a direction perpendicular to an arrangement direction of the optical sensing pixels.

In some other embodiments of the present application, the number of the at least micro lens is less than the number of the plurality of optical sensing pixels.

In one implementation manner, the at least one micro lens is one micro lens, and the plurality of optical sensing pixels are a rectangular array of 2×2 optical sensing pixels, where the one micro lens is disposed right above the rectangular array of 2×2 optical sensing pixels.

Figure 17:
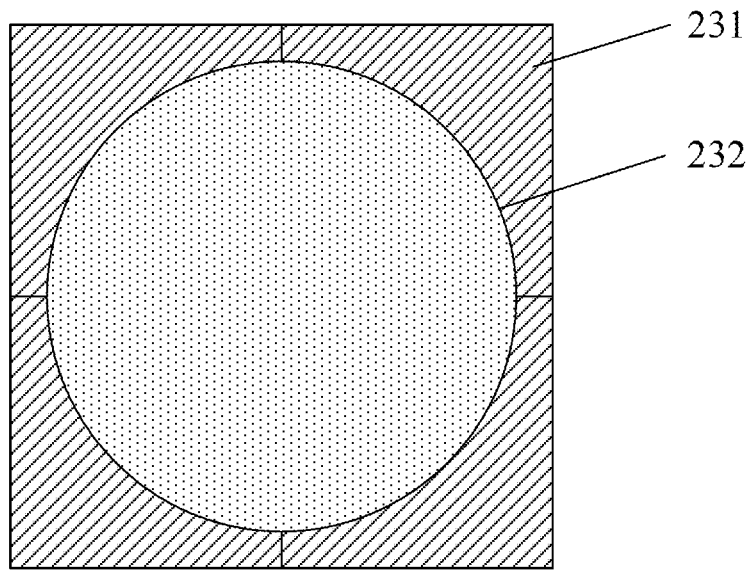

For example, as shown in FIG. 17, a fingerprint detecting unit 23 may include one micro lens 232 and four optical sensing pixels 231 distributed in a rectangular array.

In a specific implementation, at least one light shielding layer in the fingerprint detecting unit 23 may be respectively provided with openings corresponding to the four optical sensing pixels 231 under the one micro lens so that the one micro lens may receive the oblique light signals in the multiple directions in a diagonal direction of the rectangular array of 2×2 optical sensing pixels, and the one micro lens may converge the oblique light signals in the multiple directions respectively to optical sensing pixels in the rectangular array of 2×2 optical sensing pixels in the diagonal direction to increase an amount of signals that can be received by each optical sensing pixel, thereby improving the fingerprint identification effect.

Figure 18:
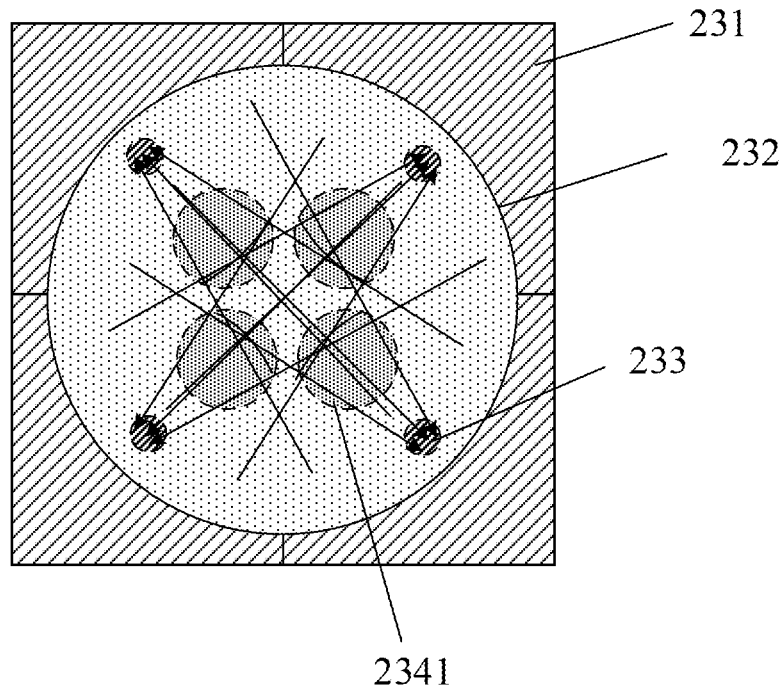
Figure 19:
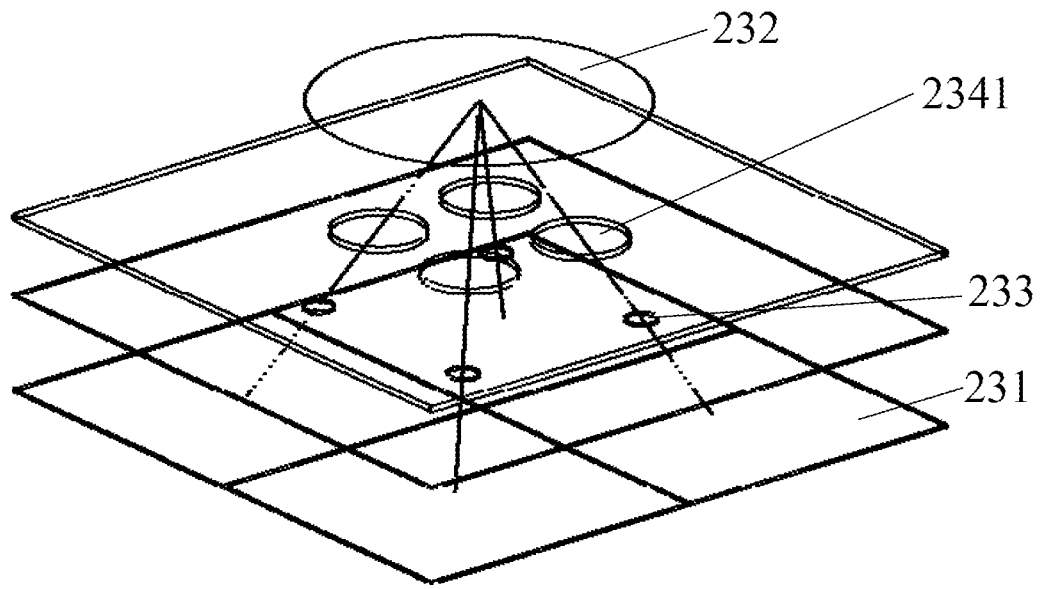

For example, as shown in FIG. 18 and FIG. 19, the at least one light shielding layer may include a top light shielding layer and a bottom light shielding layer. The top light shielding layer is provided with openings 2341 respectively corresponding to the four optical sensing pixels 231 under the one micro lens 232, and the bottom light shielding layer is provided with openings 233 respectively corresponding to the four optical sensing pixels 231 under the one micro lens 232. The one micro lens 232 converges received light signals in multiple directions respectively to the four optical sensing pixels 231 through the corresponding openings 2341 and openings 233.

Figure 20:
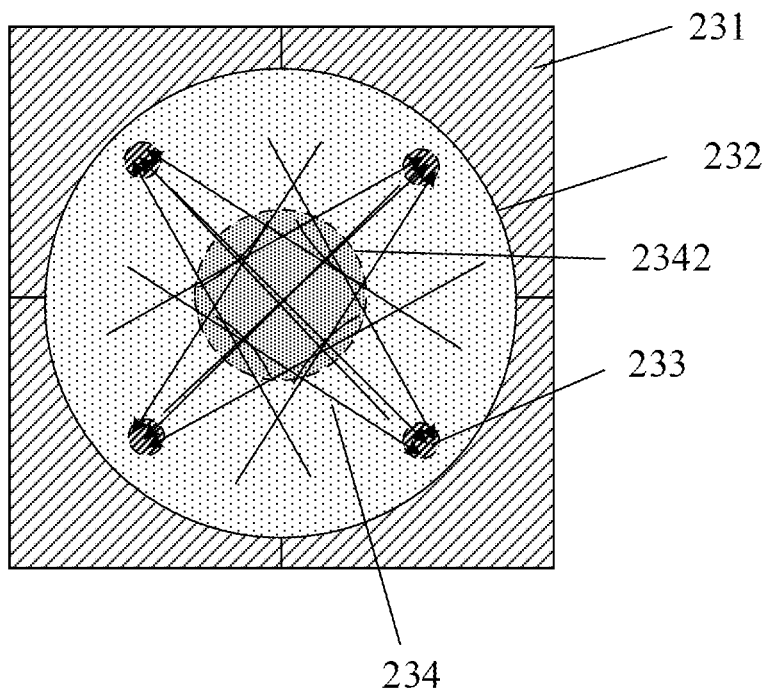
Figure 21:
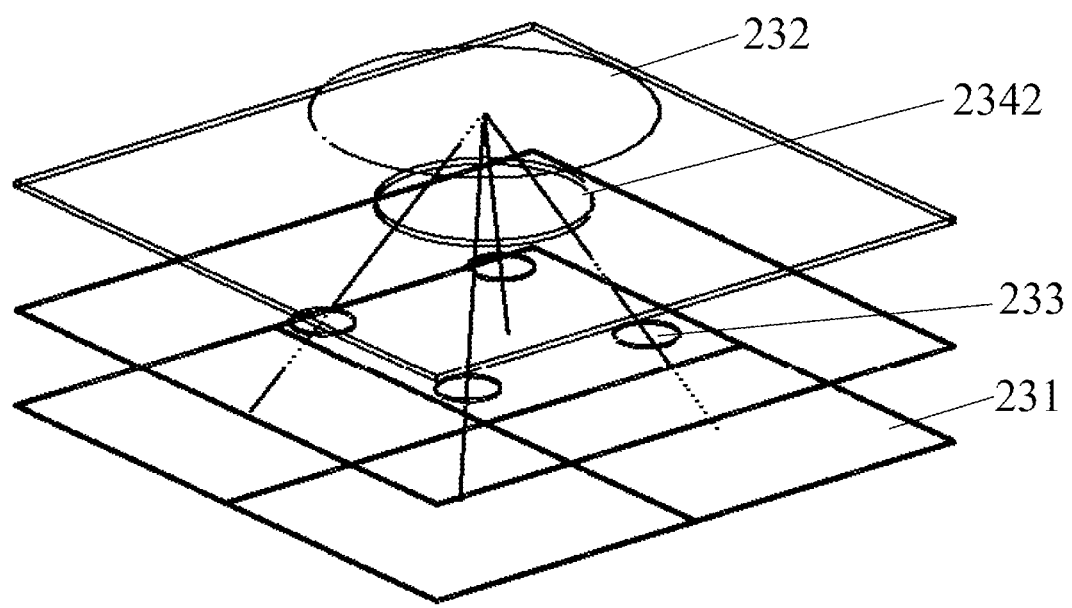

Certainly, four small holes of the top light shielding layer corresponding to the four optical sensing pixels 231 may also merge into one large hole, such as an opening 2342 shown in FIG. 20 and FIG. 21.

In another implementation manner, the one micro lens is a rectangular array of 2×2 micro lenses, the plurality of optical sensing pixels are a rectangular array of 3×3 optical sensing pixels, and one micro lens is disposed right above every four adjacent optical sensing pixels in the rectangular array of 3×3.

Figure 22:
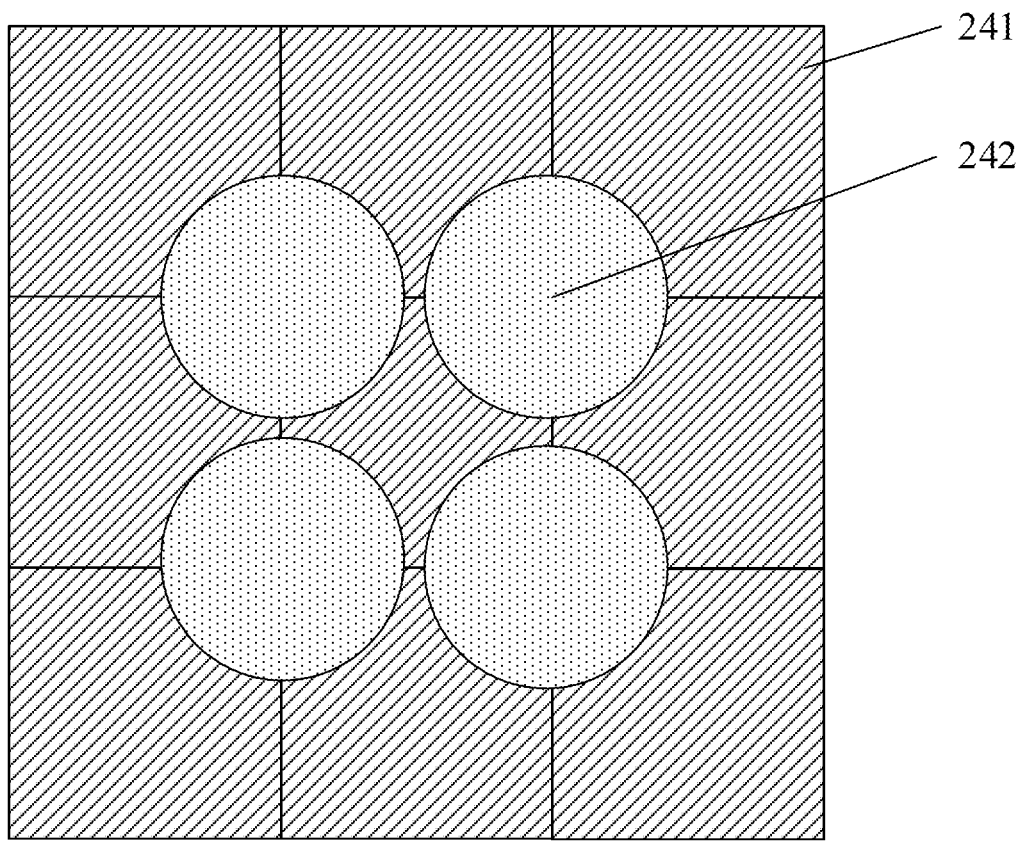

For example, as shown in FIG. 22, a fingerprint detecting unit 24 may include four micro lenses 242 distributed in a rectangular array and nine optical sensing pixels 241 distributed in a rectangular array.

In a specific implementation, at least one light shielding layer in the fingerprint detecting unit 24 may be respectively provided with openings corresponding to optical sensing pixels 241 at four corners of the rectangular array of 3×3 optical sensing pixels so that each micro lens 242 in the rectangular array of 2×2 micro lenses may converge received oblique light signals to an optical sensing pixel 241 in the optical sensing pixels 241 at the four corners of the rectangular array of 3×3 optical sensing pixels that is closest to the same micro lens 242.

Figure 23:
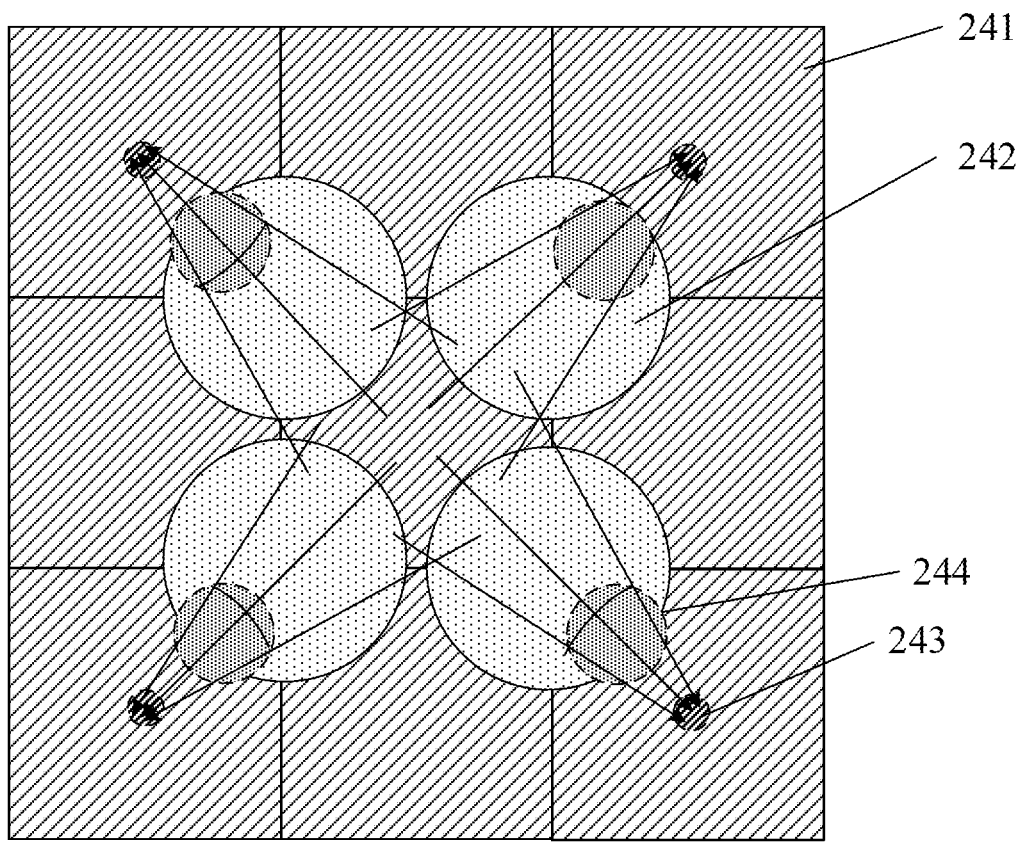

For example, as shown in FIG. 23, the at least one light shielding layer may include a top light shielding layer and a bottom light shielding layer. The top light shielding layer is provided with openings 244 respectively corresponding to the optical sensing pixels 241 at the four corners, and the bottom light shielding layer is provided with openings 243 respectively corresponding to the optical sensing pixels 241 at the four corners. Accordingly, the four micro lenses 242 may converge the oblique light signals in the multiple directions respectively to the optical sensing pixels 241 at the four corners through the corresponding openings 244 and openings 243.

Since only optical sensing pixels 241 at the four corners in the rectangular array of 3×3 optical sensing pixels will receive oblique light signals for detecting fingerprint information, in order to increase utilization of the optical sensing pixels, in some embodiments of the present application, a fingerprint detection apparatus including a plurality of fingerprint detecting units 24 may be formed by means of a staggered arrangement.

Figures 24, 25:
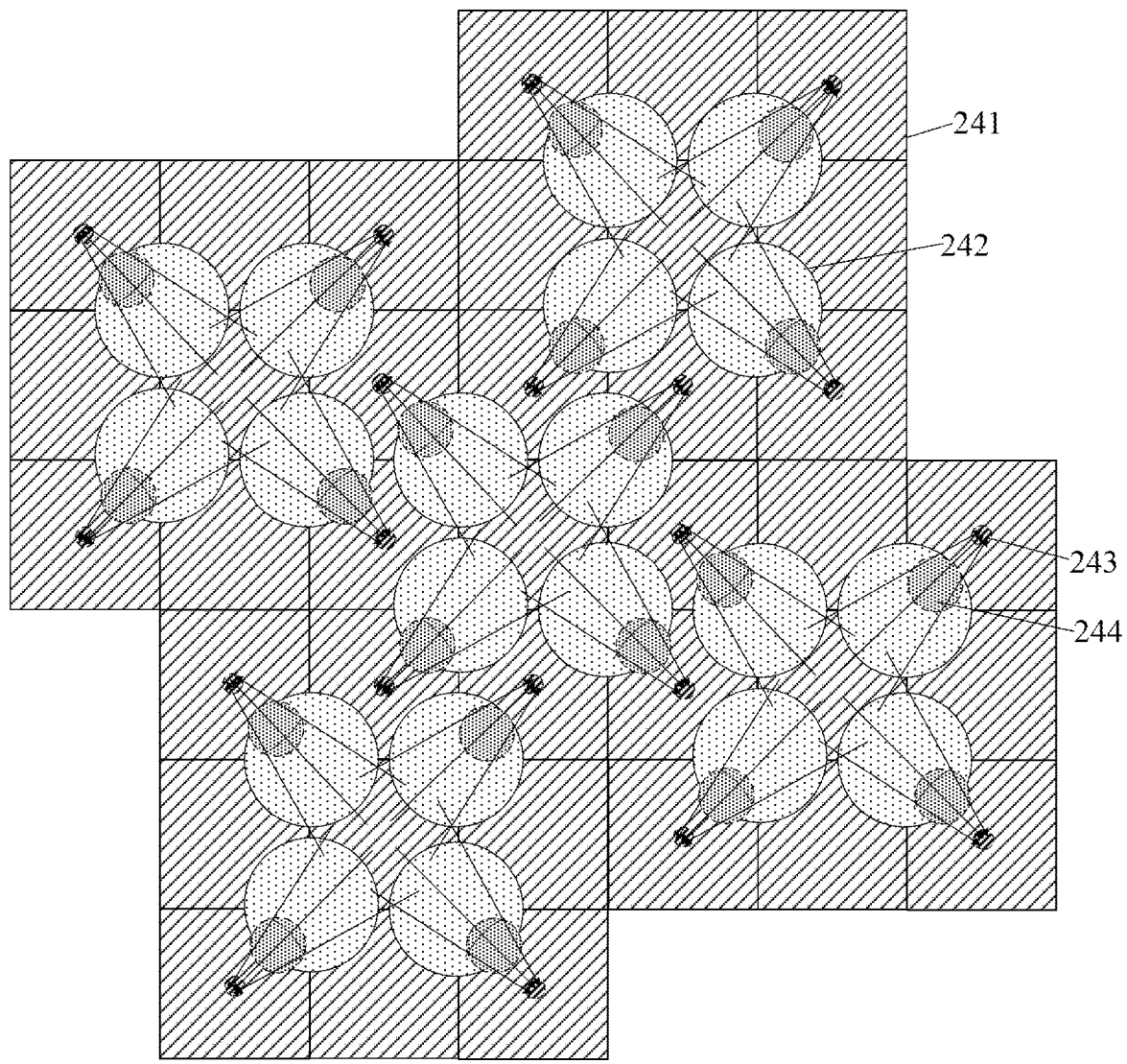

For example, as shown in FIG. 24, for a central fingerprint detecting unit located at a middle position, an optical sensing pixel 241 between an optical sensing pixel 241 at the upper left corner and an optical sensing pixel 241 at the upper right corner may be multiplexed as an optical sensing pixel 241 located at the lower left corner of another fingerprint detecting unit, an optical sensing pixel 241 between the optical sensing pixel 241 at the upper left corner and an optical sensing pixel 241 at the lower left corner of the central fingerprint detecting unit may be multiplexed as an optical sensing pixel 241 located at the lower right corner of another fingerprint detecting unit, an optical sensing pixel 241 between the optical sensing pixel 241 at the lower left corner and an optical sensing pixel 241 at the lower right corner of the central fingerprint detecting unit may be multiplexed as an optical sensing pixel 241 located at the upper right corner of another fingerprint detecting unit, and an optical sensing pixel 241 between the optical sensing pixel 241 at the lower right corner and the optical sensing pixel 241 at the upper right corner of the central fingerprint detecting unit may be multiplexed as an optical sensing pixel 241 located at the upper left corner of another fingerprint detecting unit.

Accordingly, the fingerprint detection apparatus may include a plurality of optical sensing pixels as shown in FIG. 25, where "0" represents an optical sensing pixel not for receiving a light signal, and "1", "2", "3" and "4" respectively represent optical sensing pixels for receiving light signals in four different directions. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

In another implementation manner, the at least one micro lens is a rectangular array of 3×3 micro lenses, the plurality of optical sensing pixels are a rectangular array of 4×4 optical sensing pixels, and one micro lens is disposed right above every four adjacent optical sensing pixels in the rectangular array of 4×4 optical sensing pixels.

Figure 26:
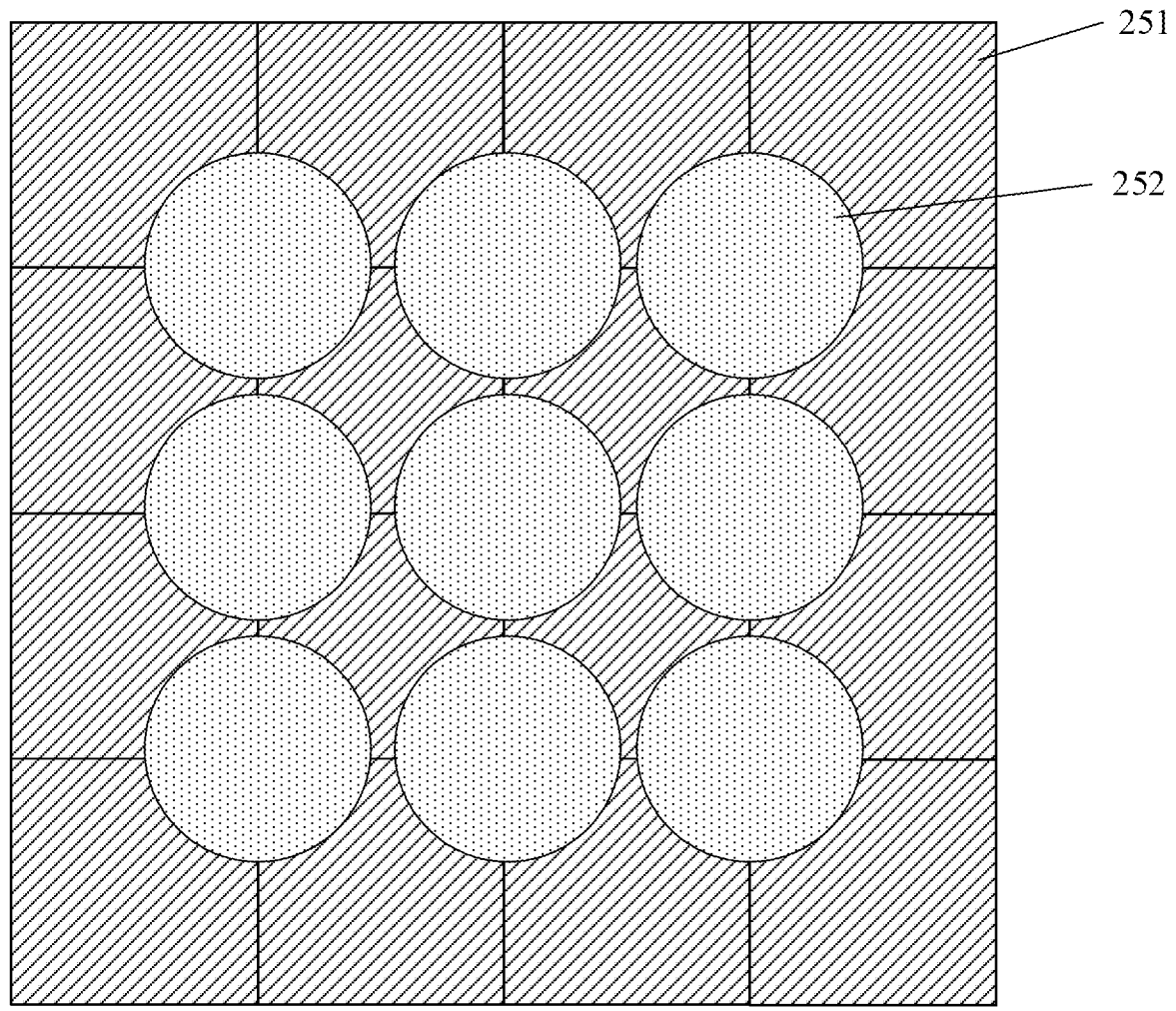

For example, as shown in FIG. 26, a fingerprint detecting unit 25 may include nine micro lenses 252 distributed in a rectangular array and 16 optical sensing pixels 251 distributed in a rectangular array. One micro lens 252 is disposed right above every four adjacent optical sensing pixels 251 in the 16 optical sensing pixels 251.

In a specific implementation, at least one light shielding layer in the fingerprint detecting unit 25 may be respectively provided with openings corresponding to the 16 optical sensing pixels 251 so that a central micro lens in the rectangular array of 3×3 micro lenses converges received oblique light signals respectively to four optical sensing pixels under the central micro lens, each of micro lenses at four corners in the rectangular array of 3×3 micro lenses converges received oblique light signals to an optical sensing pixel located at a corner of the rectangular array of 4×4 optical sensing pixels under the same micro lens, and each of the other micro lenses in the rectangular array of 3×3 micro lenses converges received oblique light signals to two optical sensing pixels on an outer side under the same micro lens.

Figures 27, 28:
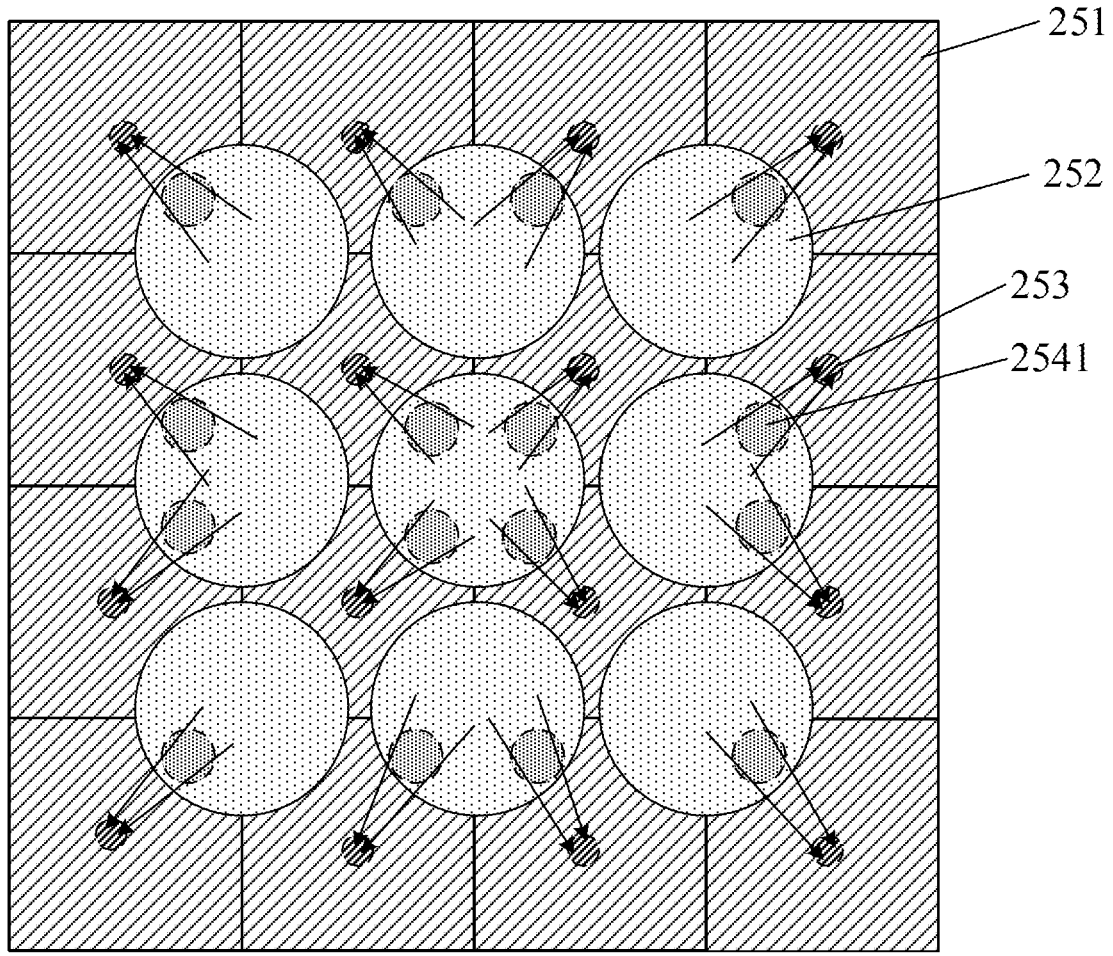

For example, as shown in FIG. 27, the at least one light shielding layer may include a top light shielding layer and a bottom light shielding layer. The top light shielding layer is provided with openings 2541 respectively corresponding to the 16 optical sensing pixels 251, and the bottom light shielding layer is provided with openings 253 respectively corresponding to the 16 optical sensing pixels 251. Accordingly, the nine micro lenses 252 may converge the oblique light signals in the multiple directions respectively to the 16 optical sensing pixels 251 through the corresponding openings 2541 and openings 253.

Accordingly, the fingerprint detection apparatus may include a plurality of optical sensing pixels as shown in FIG. 28, where "1", "2", "3" and "4" respectively represent optical sensing pixels for receiving light signals in four different directions. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

Figure 29:
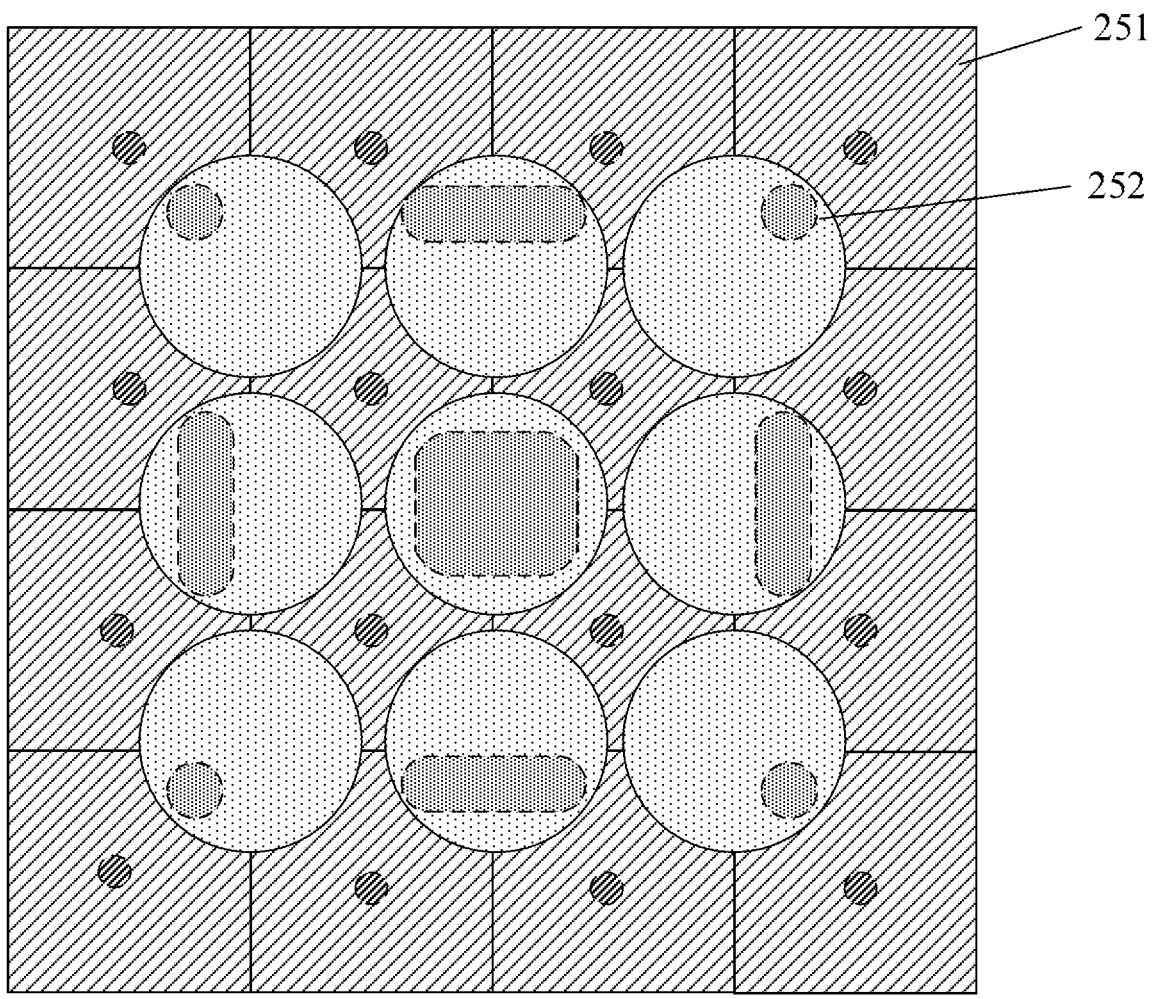

Certainly, FIG. 27 is only an example of the present application and should not be understood as limitation to the present application For example, as shown in FIG. 29, two small holes in the top light shielding layer corresponding to two optical sensing pixels 251 located between two corners in the rectangular array of 4×4 optical sensing pixels may merge into a large hole, and four small holes in the top light shielding layer corresponding to four adjacent optical sensing pixels 251 located at a center position of the rectangular array of 4×4 optical sensing pixels may merge into a large hole, so as to reduce processing difficulty and increase an amount of converged light signals, thereby improving the fingerprint identification effect of the fingerprint detection apparatus.

In some embodiments of the present application, the fingerprint detection apparatus includes a plurality of fingerprint detecting units distributed in an array, and each of the plurality of fingerprint detecting units includes one micro lens and a rectangular array of 2×2 optical sensing pixels disposed under the one micro lens. In other words, the plurality of optical sensing pixels are a rectangular array of 2×2 optical sensing pixels, and one micro lens is disposed right above the rectangular array of 2×2 optical sensing pixels. Each micro lens converges received oblique light signals in multiple directions to optical sensing pixels under a plurality of adjacent micro lenses.

Figure 30:
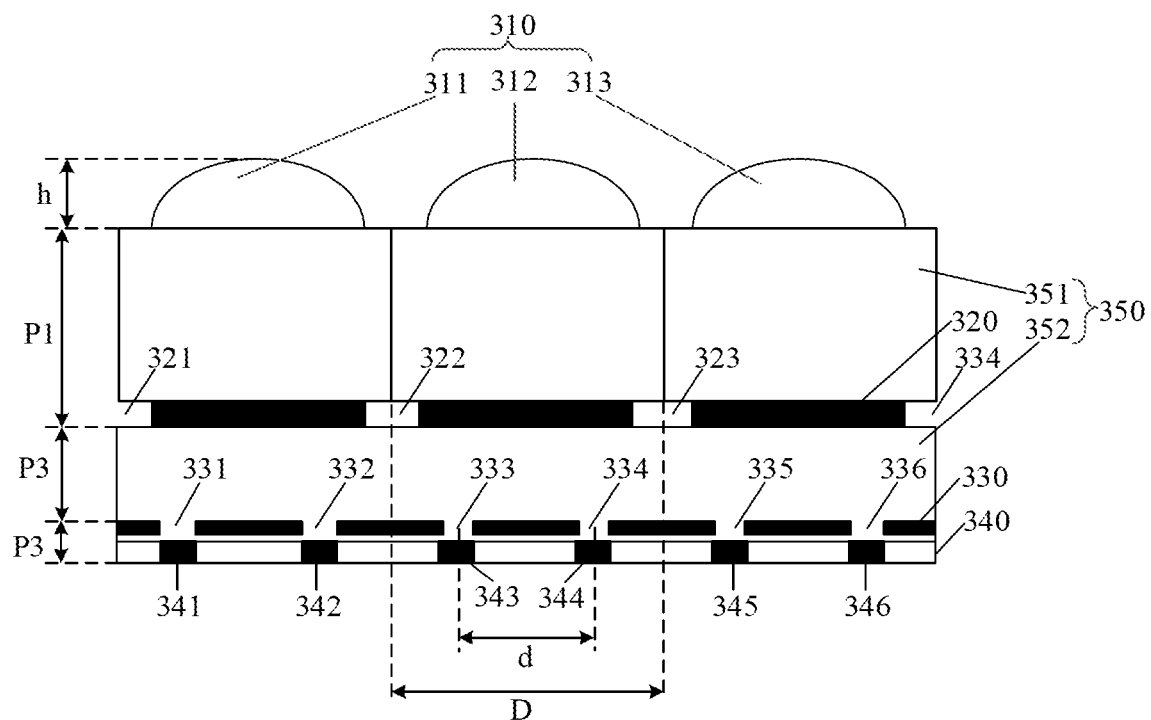

FIG. 30 is a schematic structural diagram of a fingerprint detection apparatus according to an embodiment of the present application.

As shown in FIG. 30, the fingerprint detection apparatus may include a micro lens array 310, at least one light shielding layer and an optical sensing pixel array 340. The micro lens array 310 may be disposed under a display screen of an electronic device, the at least one light shielding layer may be disposed under the micro lens array 310, and the optical sensing pixel array 340 may be disposed under the at least one light shielding layer. It should be noted that the fingerprint detection apparatus may be applicable to the electronic device 10 shown in FIG. 1 to FIG. 4, or a apparatus may be the optical fingerprint module 130 shown in FIG. 1 to FIG. 4. The micro lens array 310 and the at least one light shielding layer may be a light directing structure included in the optical component 132 shown in FIG. 3 or FIG. 4, and the optical sensing pixel array 340 may be the sensing array 133 having the plurality of optical sensing units 131 (which may also be referred to as optical sensing pixels, photosensitive pixels, pixel units, or the like) shown in FIG. 1 to FIG. 4, which will not be described redundantly herein to avoid repetition.

With continuing reference to FIG. 30, the micro lens array 310 includes a plurality of micro lenses. For example, the micro lens array 310 may include a first micro lens 311, a second micro lens 312 and a third micro lens 313. The at least one light shielding layer may include a plurality of light shielding layers. For example, the at least one light shielding layer may include a first light shielding layer 320 and a second light shielding layer 330. The optical sensing pixel array 340 may include a plurality of optical sensing pixels. For example, the optical sensing pixel array may include a first optical sensing pixel 341, a second optical sensing pixel 342, a third optical sensing pixel 343, a fourth optical sensing pixel 344, a fifth optical sensing pixel 345 and a sixth optical sensing pixel 346.

The at least one light shielding layer is provided with a plurality of light directing channels corresponding to each micro lens in the micro lens array 310, and bottoms of the plurality of light directing channels corresponding to the each micro lens respectively extend under a plurality of adjacent micro lenses.

With continuing reference to FIG. 30, the first light shielding layer 320 and the second light shielding layer 330 are respectively provided with at least one opening corresponding to each (that is, the first micro lens 311, the second micro lens 312 and the third micro lens 313) of the plurality of micro lenses. For example, the first light shielding layer 320 is provided with a first opening 321 and a second opening 322 corresponding to the first micro lens 311, the first light shielding layer 320 is further provided with the second opening 322 and a third opening 323 corresponding to the second micro lens 312, and the first light shielding layer 320 is provided with the third opening 323 and a fourth opening 324 corresponding to the third micro lens 313. Similarly, the second light shielding layer 330 is provided with a fifth opening 331 and a sixth opening 332 corresponding to the first micro lens 311, the second light shielding layer 330 is further provided with a seventh opening 333 and a eighth opening 334 corresponding to the second micro lens 312, and the second light shielding layer 330 is provided with a ninth opening 335 and a tenth opening 336 corresponding to the third micro lens 313.

In an example of the second micro lens 312, a plurality of light directing channels corresponding to the second micro lens 312 may include a light directing channel formed by the second opening 322 and the sixth opening 332 and a light directing channel formed by the third opening 323 and the ninth opening 335. The light directing channel formed by the second opening 322 and the sixth opening 332 extends under the first micro lens 311, and the light directing channel formed by the third opening 323 and the ninth opening 335 extends under the third micro lens 313.

One optical sensing pixel may be disposed under each of a plurality of light directing channels corresponding to each micro lens in the micro lens array 310.

In an example of the second micro lens 312, the second optical sensing pixel 342 is disposed under a light directing channel formed by the second opening 322 and the sixth opening 332, and the fifth optical sensing pixel 345 is disposed under a light directing channel formed by the third opening 323 and the ninth opening 335.

In other words, a plurality of optical sensing pixels are disposed under each micro lens in the micro lens array 310. The plurality of optical sensing pixels disposed under the each micro lens are respectively configured to receive light signals converged by a plurality of adjacent micro lenses and transmitted through corresponding light directing channels, and the light signals are used to detect fingerprint information of the finger.

In an example of the second micro lens 312, the third optical sensing pixel 343 and the fourth optical sensing pixel 344 may be disposed under the second micro lens 312, where the third optical sensing pixel 343 may be configured to receive an oblique light signal converged by the first micro lens 311 and transmitted through a light directing channel formed by the second opening 322 and the seventh opening 333, and the fourth optical sensing pixel 344 may be configured to receive an oblique light signal converged by the third micro lens 313 and transmitted through a light directing channel formed by the third opening 323 and the eighth opening 334.

In addition, the plurality of optical sensing pixels under each micro lens in the micro lens array 310 may be distributed in a polygon. For example, the polygon includes, but is not limited to, a rectangle or a rhombus. For another example, the plurality of optical sensing pixels under each micro lens in the micro lens array 310 may be distributed in a circle or an oval.

Since the micro lenses in the micro lens array are distributed in an array, when the plurality of optical sensing pixels under the each micro lens are distributed in a polygon, a correspondence between the micro lens array and the optical sensing array can be effectively simplified, thereby simplifying the structural design of the fingerprint detection apparatus.

By properly designing a plurality of light directing channels corresponding to each micro lens, the optical sensing pixel array 340 may receive oblique light signals in multiple directions, and by converging the oblique light signals in the multiple directions by a single micro lens, a problem that an exposure time for a solution of a single object space telecentric micro lens array is too long is solved. In other words, the fingerprint detection apparatus can not only solve a problem of a poor identification effect of vertical light signals on a dry finger and a problem of a too long exposure time for a solution of a single object space telecentric micro lens array, but also solve problems of excessive thickness, poor tolerance and excessive size of the fingerprint detection apparatus.

With continuing reference to FIG. 30, the fingerprint detection apparatus may further include a transparent medium layer 350.

The transparent medium layer 350 may be disposed at least one of the following positions: a position between the micro lens array 310 and the at least one light shielding layer; a position between the at least one light shielding layer; and a position between the at least one light shielding layer and the optical sensing pixel array 340. For example, the transparent medium layer 350 may include a first medium layer 351 located between the micro lens array 310 and the at least one light shielding layer (that is, the first light shielding layer 320), and a second medium layer 352 between the first light shielding layer 320 and the second light shielding layer 330.

A material of the transparent medium layer 350 is any transparent material that is transparent to light, such as glass, or may be transitioned by air or vacuum, which is not specifically limited in the present application.

A design manner of a plurality of light directing channels corresponding to each micro lens will be described hereinafter in detail.

In some embodiments of the present application, a plurality of light directing channels corresponding to each micro lens in the micro lens array 310 may distributed in a direction of an optical axis of the same micro lens in a central symmetric manner. By disposing the plurality of light directing channels corresponding to each micro lens in a central symmetric manner, process complexity of the fingerprint detection apparatus can be reduced.

With continuing reference to FIG. 30, in an example of the second micro lens 312, the light directing channel formed by the second opening 322 and the sixth opening 332 corresponding to the second micro lens 312 and the light directing channel formed by the third opening 323 and the ninth opening 335 corresponding to the second micro lens 312 are centrally symmetric in direction of an optical axis of the second micro lens 213.

In some embodiments of the present application, each of a plurality of light directing channels corresponding to each micro lens in the micro lens array 310 and a first plane may form a preset included angle, so that a plurality of optical sensing pixels disposed under the each micro lens are respectively configured to receive light signals converged by a plurality of adjacent micro lenses and transmitted through corresponding light directing channels, where the first plane is a plane parallel to the display screen. Optionally, by the preset included angle, it can be ensured that bottom ends of the plurality of light directing channels corresponding to the each micro lens respectively extend under a plurality of micro lenses adjacent the same micro lens.

With continuing reference to FIG. 30, in an example of the second micro lens 312, a plane where the optical sensing pixel array 340 is located is parallel to the first plane, the light directing channel formed by the second opening 322 and the sixth opening 332 and the plane where the optical sensing pixel array 340 is located form a first angle, and the light directing channel formed by the third opening 323 and the ninth opening 335 and the plane where the optical sensing pixel array 340 is located form a second angle. The first angle is equal to the second angle. Certainly, in other alternative embodiments, the first angle may not be equal to the second angle, which is not limited in the embodiment of the present application.

It should be noted that the preset angle may be an included angle between an axis of a light directing channel and the first plane, or an included angle between any one of straight lines passing through the light directing channel and the first plane. In addition, a range of the preset included angle may be any range from 0 degree to 90 degrees. For example, the range of the preset included angle may be from 15 degrees to 60 degrees, or from 10 degrees to 70 degrees, which is not specifically limited in the present application.

In some embodiments of the present application, projections of a plurality of light directing channels corresponding to each micro lens in the micro lens array 310 in the first plane may be distributed in a central symmetric manner relative to a projection of an optical axis of the same micro lens in the first plane, to ensure that each optical sensing pixel in the optical sensing pixel array can receive sufficient light signals, thereby improving resolution of a fingerprint image and the fingerprint identification effect.

Figure 31:
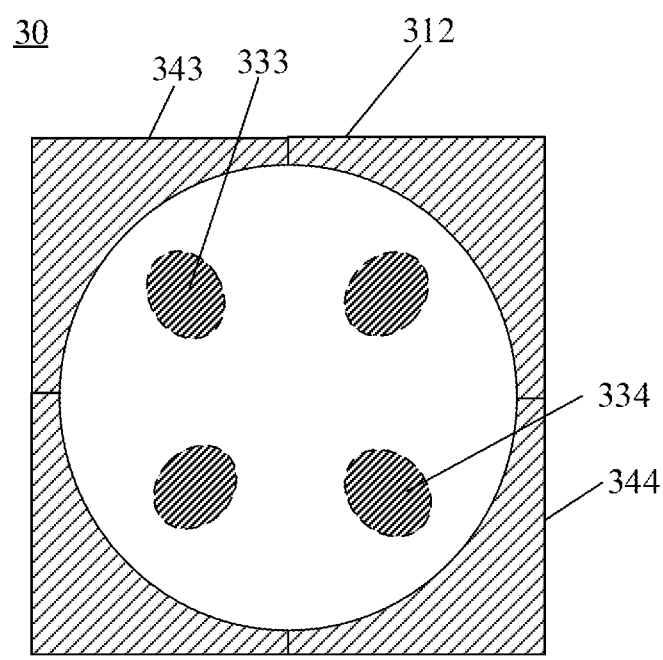

FIG. 31 is a schematic top view of a fingerprint detecting unit in the fingerprint detection apparatus shown in FIG. 30.

As shown in FIG. 31, a fingerprint detecting unit 30 may include the second micro lens 312 and a rectangular array of 2×2 optical sensing pixels disposed under the second micro lens 312.

Projections of four light directing channels corresponding to the second micro lens 312 in the first plane are distributed in a central symmetric manner along an optical axis of the second micro lens 312 in an end surface close to the optical sensing pixel array 340. In other words, four openings in the first light shielding layer 320 corresponding to the second micro lens 312 are centrally symmetric along the optical axis of the second micro lens 312, and four openings in the second light shielding layer 330 corresponding to the second micro lens 312 are centrally symmetric along the optical axis of the second micro lens 312. Optionally, openings in the first light shielding layer 320 and/or openings in the second light shielding layer 330 are oval openings.

It should be noted that, in the embodiment of the present application, the second micro lens 312 may cover part or all of a photosensitive area (PD area, AA) of the third optical sensing pixel 343. Preferably, the second micro lens 312 may cover a region in the photosensitive area (AA) of the third optical sensing pixel 343 that can be illuminated by oblique light signals converged by the first micro lens 311 and transmitted through the light directing channel formed by the second opening 322 and the seventh opening 333, to ensure that the micro lenses and the optical sensing pixels in the fingerprint detection apparatus can be both arranged in an array, thereby simplifying a producing process of the fingerprint detection apparatus.

Figure 32:
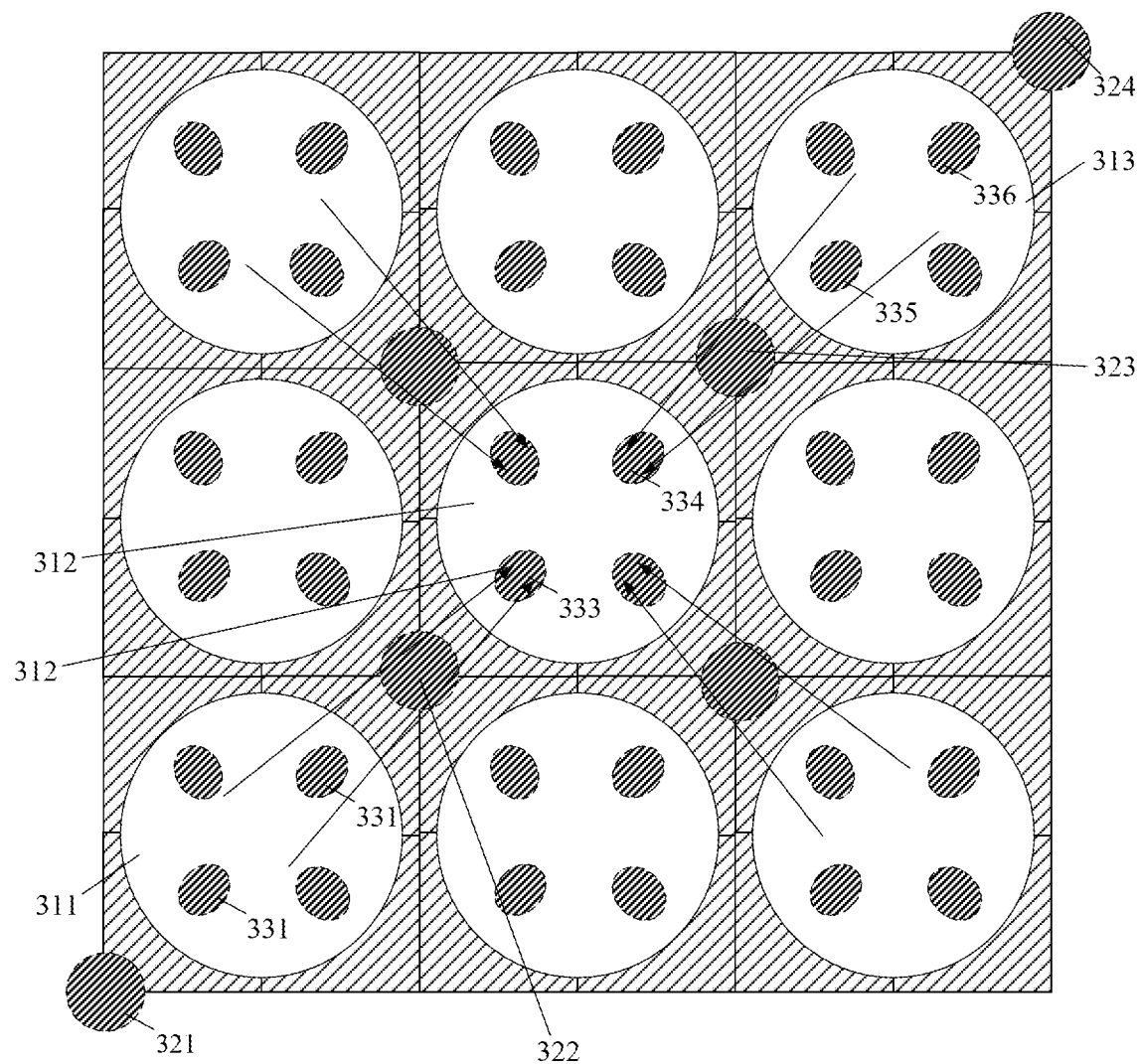

FIG. 32 is schematic top view of the fingerprint detection apparatus shown in FIG. 30.

As shown in FIG. 32, the fingerprint detection apparatus includes a rectangular array of 3×3 micro lenses, where a micro lens located at the lower left corner of the rectangular array of 3×3 micro lenses is the first micro lens 311 shown in FIG. 30, a micro lens located at the center of the rectangular array of 3×3 micro lenses is the second micro lens 312 shown in FIG. 30, and a micro lens 313 located at the upper right corner of the rectangular array of 3×3 micro lenses is the third micro lens 313 shown in FIG. 30.

In other words, each micro lens in the fingerprint detection apparatus is configured to converge received oblique light signals in multiple directions to an optical sensing pixel disposed under an adjacent micro lens in a diagonal direction of a rectangular array of 3×3 micro lenses centered on the same micro lens.

It should be understood that the embodiment of the present application does not specifically limit the arrangement and size of the optical sensing pixel array.

Figure 33:
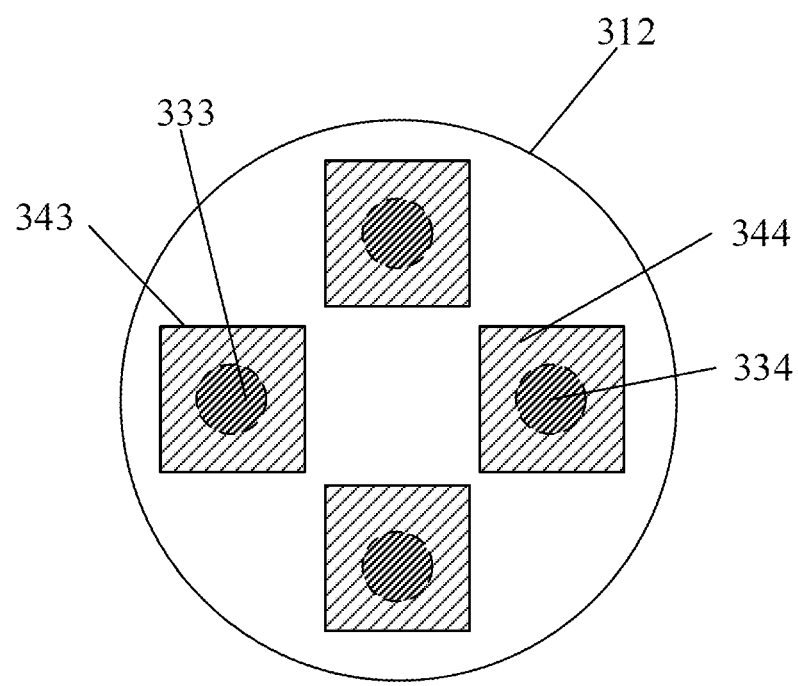

For example, as shown in FIG. 33, the fingerprint detecting unit 30 may include the second micro lens 312 and four optical sensing pixels distributed in a rhombus disposed under the second micro lens 312. The second micro lens 312 completely covers the four optical sensing pixels distributed in a rhombus. Optionally, openings in the first light shielding layer 320 and/or openings in the second light shielding layer 330 are circular openings.

In this case, each micro lens in the fingerprint detection apparatus may be configured to converge received oblique light signals in multiple directions to an optical sensing pixel disposed under an adjacent micro lens in a direction of a side of a rectangular array of 3×3 micro lenses centered on the same micro lens.

Certainly, in other alternative embodiments, openings in the first light shielding layer 320 and/or openings in the second light shielding layer 330 are polygonal openings, such as quadrilateral openings.

Figure 34:
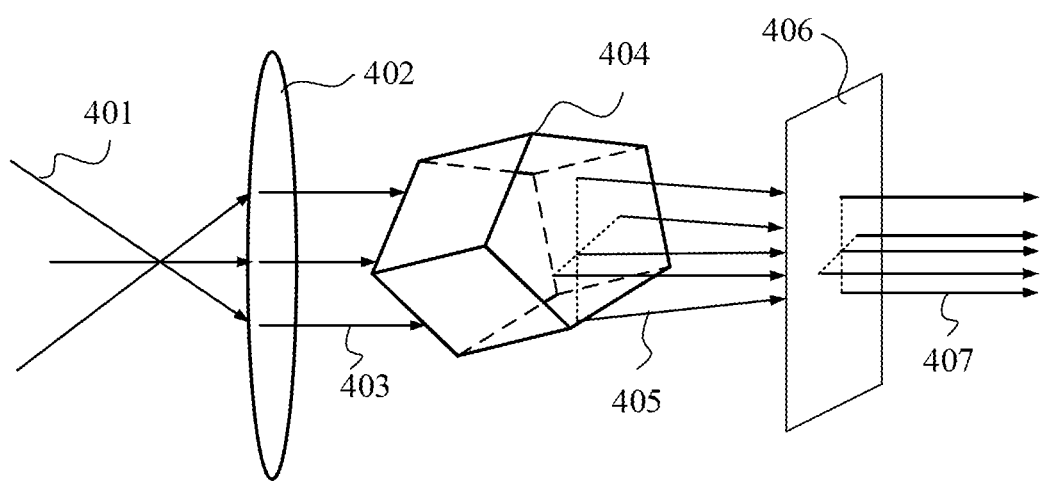
FIG. 34 to FIG. 36 are schematic structural diagrams of a fingerprint detection system according to embodiments of the present application.

FIG. 34 is a schematic structural diagram of a fingerprint detection system 40 according to an embodiment of the present application.

As shown in FIG. 34, the fingerprint detection system 40 may include a lens 402, a prism 404 located under the lens 402, and an optical sensing pixel array 406 located under the prism 404.

The lens 402 is configured to converge received light signals 401 in multiple directions to the prism 404, and the prism 404 is configured to image light signals 403 converged by the lens 402 to the optical sensing pixel array 403 by reflection and/or refraction, so that the optical sensing pixel array 406 outputs generated analog image signals 407 that can represent a plurality of fingerprint images to a subsequent module for signal processing and fingerprint identification by the subsequent module.

It should be noted that the prism 404 may convert one incident light signal into a plurality of light signals by reflection and/or refraction and transmit them to the optical sensing pixel array 406. In other words, the prism 404 may form a plurality of images for one object by reflection and/or refraction.

With continuing reference to FIG. 34, the prism 404 may be a heptagonal prism or a prism in another shape, which is not specifically limited in the present application.

Figure 35:
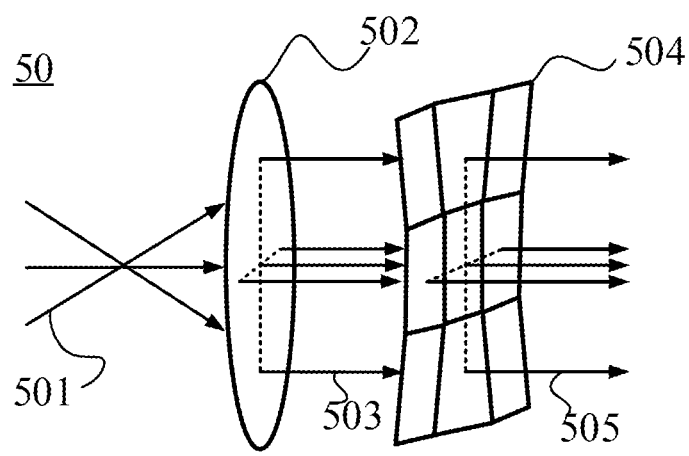

FIG. 35 is a schematic structural diagram of another fingerprint detection system according to an embodiment of the present application.

As shown in FIG. 35, a fingerprint detection system 50 may include a lens 502 and an optical sensing pixel array 504 located under the lens 502.

The optical sensing pixel array 504 may include a plurality of optical sensing units, and the plurality of optical sensing units are disposed in parallel or at a preset angle along a plane where the display screen is located. For example, the plurality of optical sensing units are obliquely disposed at different angles along the plane where the display screen is located. The lens 502 is configured to converge received light signals 501 in multiple directions to the optical sensing pixel array 504, and the optical sensing pixel array 504 forms a plurality of images for one object through the plurality of optical sensing units obliquely disposed at different angles, and then outputs generated analog image signals 505 that can represent a plurality of fingerprint images to a subsequent module for signal processing and fingerprint identification by the subsequent module.

It should be understood that FIG. 5 to FIG. 35 are only examples of the fingerprint detecting unit of the present application and should not be understood as limitation to the present application. A fingerprint detecting unit, a fingerprint detection apparatus or a fingerprint detection system that performs fingerprint identification based on light signals in multiple directions and can be achieved based on the invention idea of the present application each falls within the protection scope of the present application.

For example, in other alternative embodiments, the first light shielding layer 320 may also be provided with a plurality of openings corresponding to each micro lens, where a plurality of light directing channels corresponding to each micro lens respectively pass through the plurality of openings in the first light shielding layer 320 corresponding to the same micro lens.

For another example, each micro lens in the micro lens array 310 may be filled in a circle or a square. A material of each micro lens in the micro lens array 310 may be plastic or glass. The producing process of each micro lens in the micro lens array 310 may be achieved by a micro-nano processing process or a compression molding process.

For example, the light path designs are described in the foregoing drawings by an example that the at least one light shielding layer includes a top light shielding layer and a bottom light shielding layer, but the present application is not limited thereto.

For example, in one embodiment of the present application, the at least one light shielding layer included in the fingerprint detection apparatus is a plurality of light shielding layers, a bottom light shielding layer of the plurality of light shielding layers is provided with a plurality of openings respectively corresponding to the optical sensing pixels so that the at least one micro lens converges the oblique light signals in the multiple directions respectively to the plurality of optical sensing pixels through the plurality of openings.

In a specific implementation, apertures of openings in the plurality of light shielding layers corresponding to a same pixel decrease in order from top to bottom. An aperture of an opening in an upper light shielding layer is set to be larger than an aperture of an opening in a lower light shielding layer so that the plurality of light shielding layers may direct more light signals (in a certain angular range) to corresponding photosensitive pixels.

For another example, in some other embodiments of the present application, the at least one light shielding layer may be one light shielding layer, the one light shielding layer is provided with a plurality of oblique holes respectively corresponding to the plurality of optical sensing pixels so that the at least one micro lens converges the oblique light signals in the multiple directions respectively to the plurality of optical sensing pixels through the plurality of holes.

In a specific implementation, a thickness of the one light shielding layer may be greater than or equal to a preset thickness so that the plurality of oblique holes are respectively used to transmit the oblique light signals in the multiple directions, thereby avoiding occurrence of crosstalk in the oblique light signals transmitted by the plurality of oblique holes.

It should be understood that an oblique angle of each of the plurality of oblique holes may be determined according to requirements of a light path design. The plurality of oblique holes may be a plurality of oblique holes with oblique angles different from each other, or oblique holes with the partially same or wholly same oblique angles.

In one embodiment of the present application, transmittance of each of the at least one light shielding layer to light in a specific wave band (such as visible light or a wave band above 610 nm) is less than 20% to avoid that corresponding light passes. For example, each of the at least one light shielding layer may be a metal layer, and correspondingly, an opening provided in a light shielding layer may be a through hole formed in the metal layer.

For example, the opening is a cylindrical through hole. In one embodiment of the present application, an aperture of the opening is larger than 100 nm so as to transmit required light for imaging. The aperture of the opening is also less than a predetermined value to ensure that the light shielding layer could shield unwanted light. That is, a parameter of the opening is set as far as possible such that light signals required for imaging are transmitted to optical sensing pixels to the maximum and unwanted light are shielded to the maximum. For example, the parameter of the opening may be set such that a light signal obliquely incident at a specific angle (for example 35 degrees) is transmitted to a corresponding optical sensing pixel to the maximum and other light signals are shielded to the maximum.

In some embodiments of the present application, the fingerprint detection apparatus may further include a transparent medium layer.

The transparent medium layer is configured to connect the at least one micro lens, the at least one light shielding layer and the plurality of optical sensing pixels. The transparent medium layer may transmit a light signal in a target wave band (that is, a light signal in a wave band required for fingerprint detection). For example, the transparent medium layer may adopt an oxide, a nitride or the like. Optionally, the transparent medium layer may include a plurality of layers to respectively achieve functions such as protection, transition and cushioning. For example, a transition layer may be disposed between an inorganic layer and an organic layer to achieve tight connection; and a protective layer may be disposed on an easily oxidized layer to achieve protection.

In some embodiments of the present application, the fingerprint detection apparatus may further include a filter layer.

The filter layer is disposed in a light path between the at least one micro lens and the plurality of optical sensing pixels or disposed above the micro lens, and configured to filter out a light signal in a non-target wave band to transmit a light signal in a target wave band. Optionally, transmittance of the filter layer to light in a target wave band is greater than or equal to 80%, and a cutoff rate of the filter layer to light in a non-target wave band is greater than or equal to 80%. Optionally, the filter layer may be a filter layer independently provided. For example, the filter layer may be a filter layer formed by using blue crystal or blue glass as a carrier. Optionally, the filter layer may be a coating film provided on a surface of any layer in the light path. For example, a coating film may be provided on a surface of a photosensitive pixel, a surface of any one of transparent medium layers, a lower surface of a micro lens or the like so as to form the filter layer.

Figure 36:
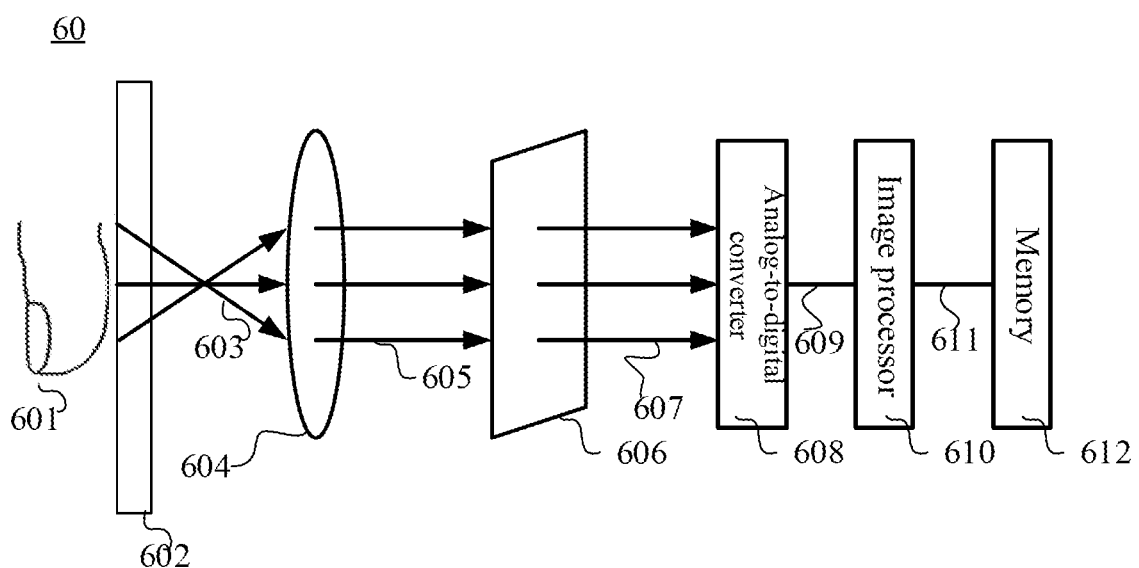

FIG. 36 is a schematic structural diagram of a fingerprint detection system 60 according to an embodiment of the present application.

As shown in FIG. 36, light 603 reflected via a sampled object above a display screen 602 is converged to a fingerprint detection apparatus 606 by a lens or micro lens 604, the fingerprint detection apparatus 606 receives light signals 605 converged by the lens or micro lens 604 to generate and output an analog image signal 607 to an analog-to-digital converter 608, the analog-to-digital converter 608 generates a digital image signal 609 based on the received analog image signal 607 and outputs the analog image signal 609 to an image processor 610, the image processor 610 generates a compressed image signal 611, and a memory 612 stores the compressed image signal 611, so that an electronic device installed with the fingerprint detection system 60 acquires the compressed image signal 611 from the memory 612 and performs fingerprint registration or fingerprint identification based on the compressed image signal 611.

It should be noted that optical fingerprint identification technology has a risk of misidentification. For example, a fake fingerprint containing some fingerprint information is placed at a sampling position, and a fingerprint image to be matched is generated by light and shadow imaging. When matching between the fingerprint image and a template in a database is successful, an "unlock" operation is completed.

Due to a wide range of ways to acquire personal fingerprint information and clear fingerprint characteristics and low manufacturing costs of a 2D fingerprint image mold, a solution that fingerprint identification is performed based on a 2D fingerprint image has great security risks.

An embodiment of the present application provides a method for identifying a fingerprint. By identifying whether a sampled object placed above a display screen is a 2D object or a 3D object, identification of the 2D object is rejected from the source of the identification process, which can effectively reduce a risk of misidentification.

Figure 37:
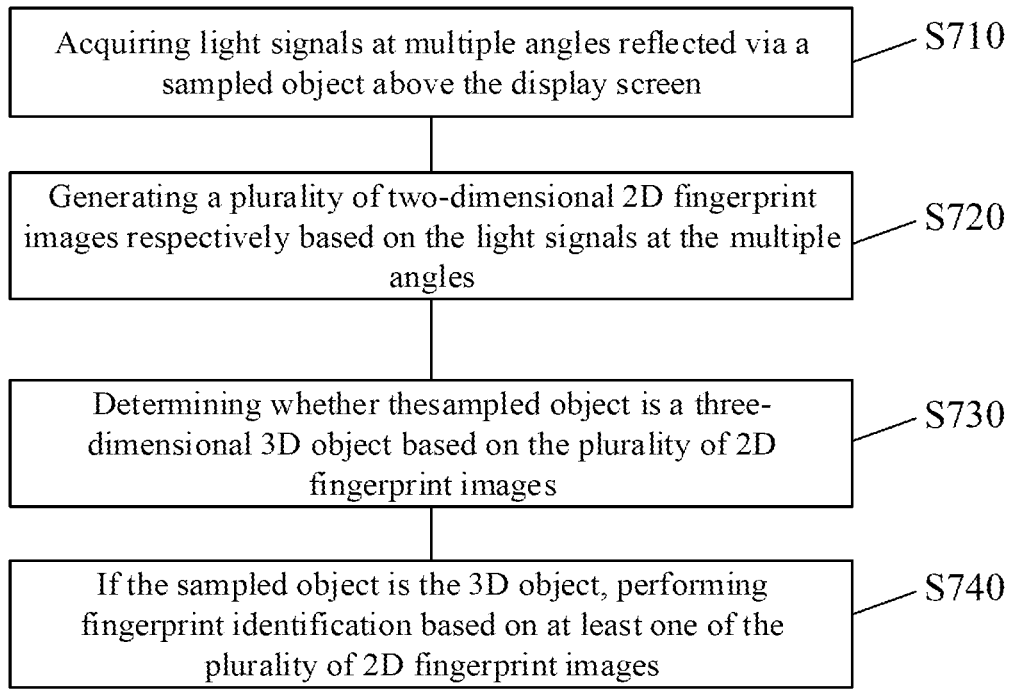
FIG. 37 is a schematic flowchart of a method for identifying a fingerprint according to an embodiment of the present application.

FIG. 37 is a schematic flowchart of a method 70 for identifying a fingerprint according to an embodiment of the present application. It should be understood that the method 70 may be executed by the electronic device having a fingerprint identification module shown in FIG. 1 to FIG. 4 to implement under-screen fingerprint identification. The method 70 may also be executed only by a fingerprint detection apparatus including a detecting unit, which is not specifically limited in the present application. For convenience of illustration, a fingerprint identification apparatus (which may also be referred to as a fingerprint identification apparatus, a fingerprint detection system or a fingerprint identification system) will be described hereinafter as an example.

As shown in FIG. 37, the method 70 may include some or all of the following content:

S710, acquiring, by a fingerprint detection apparatus, light signals in multiple directions reflected via a sampled object above a display screen;

S720, generating, by the fingerprint detection apparatus, a plurality of two-dimensional (2 Dimensions, 2D) fingerprint images respectively based on the light signals in the multiple directions;

S730, determining, by the fingerprint detection apparatus, whether the sampled object is a three-dimensional (3 Dimensions, 3D) object based on the plurality of 2D fingerprint images; and S740, if the sampled object is the 3D object, performing, by the fingerprint detection apparatus, fingerprint identification based on at least one of the plurality of 2D fingerprint images.

In short, after acquiring the plurality of 2D fingerprint images through the light signals from the multiple directions, the fingerprint detection apparatus may determine whether the sampled object is a 2D object or a 3D object and perform subsequent fingerprint identification when the sampled object is the 3D object.

In other words, a distinction between a 2D object and a 3D object is effectively achieved through the light signals in the multiple directions, thereby improving security of the fingerprint identification.

It should be understood that the specific parameters of the light signals in the multiple directions involved in the embodiment of the present application are not specifically limited.

For example, the light signals in the multiple directions include a light signal perpendicular relative to the display screen and a light signal oblique relative to the display screen; or the light signals in the multiple directions include light signals oblique relative to the display screen. For example, the light signals in the multiple directions only include light signals oblique relative to the display screen.

For another example, included angles between the light signals in some or all of the multiple directions and the display screen may be the same or different.

Figure 38:
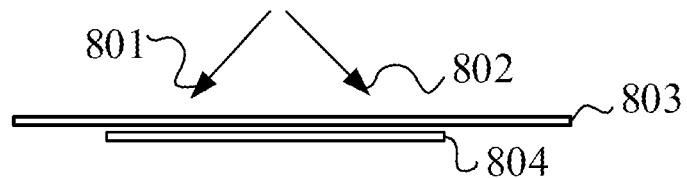
FIG. 38 is a schematic structural diagram of light signals in two directions received by a fingerprint detection apparatus according to an embodiment of the present application.
Figure 39:
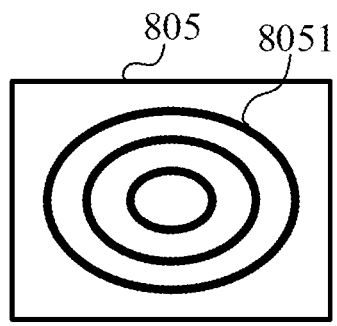
FIG. 39 is a schematic diagram of a 2D fingerprint image acquired by a fingerprint detection apparatus in a case that a sampled object is a 2D object according to an embodiment of the present application.
Figure 40:
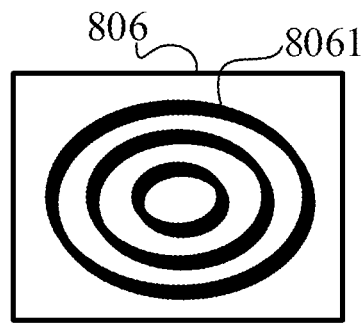
FIG. 40 and FIG. 41 are schematic diagrams of 2D fingerprint images acquired by a fingerprint detection apparatus in a case that a sampled object is a 3D object according to embodiments of the present application, respectively.
Figure 41:
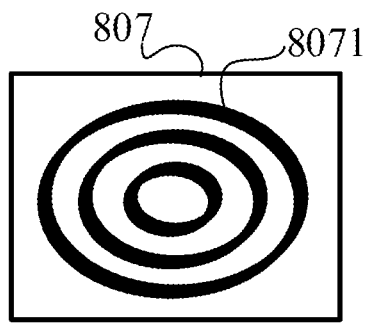

FIG. 38 is a schematic structural diagram of a fingerprint detection system according to an embodiment of the present application. FIG. 39 to FIG. 41 are fingerprint images that can be acquired by a fingerprint detection apparatus in the fingerprint detection system shown in FIG. 38, respectively.

As shown in FIG. 38, a fingerprint detection apparatus 804 receives a light signal 801 and a light signal 802 reflected via a sampled object.

In a case that the sampled object is a 2D object, the fingerprint detection apparatus 804 may acquire a 2D fingerprint image, where the 2D fingerprint image may include an image line used to represent a line of a finger ridge. Since the 2D object is a planar object, a width of the image line in the 2D fingerprint image acquired by the fingerprint detection apparatus 804 and a width of a line of a ridge in the 2D object are scaled in proportion.

It should be understood that the 2D fingerprint image acquired by the fingerprint detection apparatus 804 may include at least one image line used to represent a line of a fingerprint rigid, each of the at least one image line may include at least one line unit, and each of the at least one line unit may a pixel value formed by one optical sensing pixel or more optical sensing pixels in the fingerprint detection apparatus 804. A width of each of the at least one line unit may be a length in a direction perpendicular to an image line where the same line unit is located.

As shown in FIG. 39, the fingerprint detection apparatus 804 may form a 2D fingerprint image 805 after receiving the light signal passing through a display screen 803 or after receiving the light signal 801 passing through the display screen 803, where a width of each line unit of an image line 8051 of the 2D fingerprint image 805 is equal.

In a case that the sampled object is a 3D object, the fingerprint detection apparatus 804 may acquire a 2D fingerprint image after receiving a light signal passing through the display screen 803, where the 2D fingerprint image may include an image line used to represent a line of a ridge. Since the 3D object is a stereoscopic object, if the light signal received by the fingerprint detection apparatus 804 is an oblique light signal reflected via the 3D object, a light signal reflected via a side of the ridge of the 3D object may also form an image line of the 2D fingerprint image. Therefore, for the case that the sampled object is a 3D object, a width of an image line in the 2D fingerprint image is not proportional to a width of a line of a ridge pressed against the display screen 803 in the 3D object.

As shown in FIG. 40, the fingerprint detection apparatus 804 acquires a 2D fingerprint image 806 after receiving the light signal 802 passing through the display screen 803. A width of a line unit parallel to the light signal 802 in an image line 8061 of the 2D fingerprint image 806 may be equal to a fixed value, and a width of a line unit intersecting the light signal 802 in the image line 8061 of the 2D fingerprint image 806 may be greater than the fixed value. Optionally, the fixed value may be a product of a scale ratio of the fingerprint detection apparatus 804 and a width of a line of a ridge pressed against the display screen 803 in the 3D object.

In other words, the width of the line unit parallel to the light signal 802 in the image line 8061 of the 2D fingerprint image 806 may be equal to a width of a line unit in an image line of the 2D fingerprint image 805. The width of the line unit intersecting the light signal 802 in the image line 8061 of the 2D fingerprint image 806 may be greater than the width of the line unit in the image line of the 2D fingerprint image 805.

Similarly, as shown in FIG. 41, the fingerprint detection apparatus 804 acquires a 2D fingerprint image 807 after receiving the light signal 801 passing through the display screen 803. A width of a line unit parallel to the light signal 801 in an image line 8071 of the 2D fingerprint image 807 may be less than a width of a line unit intersecting the light signal 801 in the image line 8071 of the 2D fingerprint image 807.

Based on the foregoing analysis, in some embodiments of the present application, the fingerprint detection apparatus may first determine whether the plurality of 2D fingerprint images are the same, and then determine whether the sampled object is a 3D object based on whether the plurality of 2D fingerprint images are the same.

For example, if the plurality of 2D fingerprint images are completely the same, it is determined that the sampled object is a 2D object. If the plurality of 2D fingerprint images are different, it can be determined that the sampled object is a 3D object.

It should be understood that the plurality of 2D fingerprint image are different, which may refer to that the plurality of 2D fingerprint images are completely different, or the plurality of 2D fingerprint images are partially different.

For example, if curvature of the plurality of 2D fingerprint images with respect to a same image line is different, the fingerprint detection apparatus may determine that the plurality of 2D fingerprint images are different; and/or if widths of the plurality of 2D fingerprint images with respect to a same image line are different, the fingerprint detection apparatus may determine that the plurality of 2D fingerprint images are different.

For another example, if curvature of the plurality of 2D fingerprint images with respect to a same line unit is different, the fingerprint detection apparatus may determine that the plurality of 2D fingerprint images are different; and/or if widths of the plurality of 2D fingerprint images with respect to a line unit are different, the fingerprint detection apparatus may determine that the plurality of 2D fingerprint images are different.

For another example, if the plurality of 2D fingerprint images do not completely overlap, the fingerprint detection apparatus determines that the plurality of fingerprint images are different.

As an example of S740, the fingerprint detection apparatus may first generate a target 2D fingerprint image based on the plurality of 2D fingerprint images, image lines of the target 2D fingerprint image including image lines of the plurality of 2D fingerprint images overlapping each other; and then the fingerprint detection apparatus may perform the fingerprint identification based on the target 2D fingerprint image.

For example, if matching between the target 2D fingerprint image and a pre-stored 2D fingerprint image is successful, the fingerprint detection apparatus determines that the fingerprint identification is successful; and/or if matching between the target 2D fingerprint image and a pre-stored 2D fingerprint image is failed, the fingerprint detection apparatus determines that the fingerprint identification is failed.

In other words, the fingerprint detection apparatus may perform the fingerprint identification directly based on a 2D fingerprint image after determining that the sampled object is a 3D object. In this case, a 2D fingerprint image template for matching may be pre-stored in a memory of the fingerprint detection apparatus or a memory of an electronic device to which the fingerprint detection apparatus belongs, so as to facilitate the matching of the target 2D fingerprint image. The 2D fingerprint image template may be a fingerprint template acquired through a fingerprint registration process.

It should be understood that the target 2D fingerprint image may be a fingerprint image acquired by the fingerprint detection apparatus through correction and calculation based on the plurality of acquired 2D fingerprint images. For example, the target 2D fingerprint image may be a fingerprint image formed by overlaps of the plurality of 2D fingerprint images. For example, for a 2D fingerprint image 808 shown in FIG. 42, the 2D fingerprint image 808 may include at least one image line 8081. Certainly, the target 2D fingerprint image may also be a fingerprint image directly formed by the fingerprint detection apparatus based on a received light signal reflected via the sampled object and perpendicular relative to the display screen.

As another example of S740, the fingerprint detection apparatus may first generate a target 3D fingerprint image based on the target 2D fingerprint image, and then perform the fingerprint identification based on the target 3D fingerprint image.

For example, if matching between the target 3D fingerprint image and a pre-stored 3D fingerprint image is successful, the fingerprint detection apparatus determines that the fingerprint identification is successful; and/or if matching between the target 3D fingerprint image and a pre-stored 3D fingerprint image is failed, the fingerprint detection apparatus determines that the fingerprint identification is failed.

In other words, the fingerprint detection apparatus may form a 3D fingerprint image based on a 2D fingerprint image after determining that the sampled object is a 3D object, and then perform the fingerprint identification based on the 3D fingerprint image. In this case, a 3D fingerprint image template for matching may be pre-stored in a memory of the fingerprint detection apparatus or a memory of an electronic device to which the fingerprint detection apparatus belongs, so as to facilitate the matching of the target 3D fingerprint image. The 3D fingerprint image template may be a fingerprint template acquired through a fingerprint registration process.

It should be understood that the fingerprint identification may also be performed in another matching manner in the embodiment of the present application, which is not specifically limited in the present application.

For example, a curved surface of the target 3D fingerprint image is projected onto a fixed plane, that is, a 3D fingerprint image obtained under different pressing forces is standardized into a 2D fingerprint image, and then matching is performed based on the 2D fingerprint image and the 2D fingerprint image template to reduce a mismatch rate, thereby improving user experience.

For another example, a plane of the 2D fingerprint image template is transmitted onto a fixed curved surface to form a 3D fingerprint image template, and then matching is performed based on the 3D fingerprint image template and the target 3D fingerprint image to improve security, thereby improving user experience.

An implementation manner of the target 3D fingerprint image of the embodiment of the present application will be described hereinafter.

In some embodiments of the present application, first, the fingerprint detection apparatus determines a height of each line unit on each image line in the target 2D fingerprint image based on the target 2D fingerprint image and a first 2D fingerprint image of the plurality of 2D fingerprint images; and then the fingerprint detection apparatus generates the target 3D fingerprint image based on the height of the each line unit on the each image line in the target 2D fingerprint image.

The first 2D fingerprint image may be a fingerprint image formed by the fingerprint detection apparatus based on a received light signal reflected via the sampled object and oblique relative to the display screen, and the target 2D fingerprint image may be a fingerprint image acquired by the fingerprint detection apparatus through correction and calculation based on the plurality of acquired 2D fingerprint images. Certainly, the target 2D fingerprint image may also be a fingerprint image formed by the fingerprint detection apparatus based on a received light signal reflected via the sampled object and perpendicular relative to the display screen.

Figure 42:
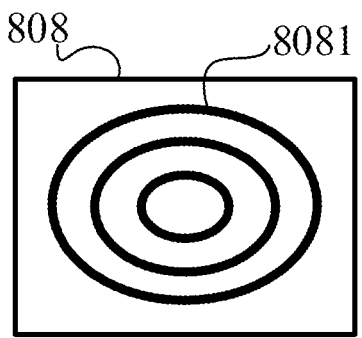
FIG. 42 is a schematic diagram of a target 2D fingerprint image acquired based on the 2D fingerprint images shown in FIG. 40 and FIG. 41 according to an embodiment of the present application.

With reference to the accompanying drawings, the first 2D fingerprint image may be the 2D fingerprint image 806 as shown in FIG. 40 or the 2D fingerprint image 807 as shown in FIG. 41, and the target 2D fingerprint image may be the 2D fingerprint image 805 as shown in FIG. 39 or the 2D fingerprint image 808 as shown in FIG. 42. In an example that the target 2D fingerprint image is the 2D fingerprint image 808, as shown in FIG. 43, the image line 8081 of the target 3D fingerprint image may have a certain height.

Figure 43:
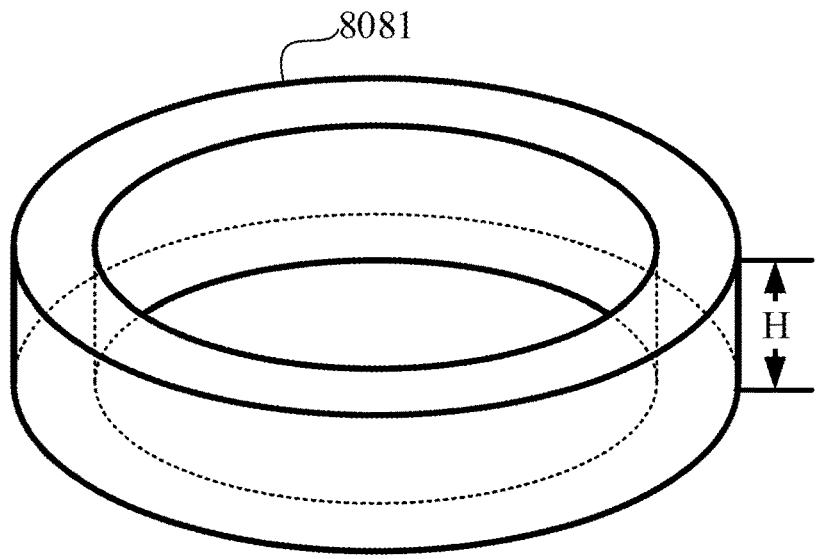
FIG. 43 is a schematic diagram of an image line in a target 3D fingerprint image acquired based on the target 2D fingerprint imaged shown in FIG. 42 according to an embodiment of the present application.

It should be noted that FIG. 43 is only an example of the present application and should not be understood as limitation to the present application.

For example, in other alternative embodiments, heights of line units in the image line 8081 may be partially or completely different. In other words, an upper surface of the fingerprint line 8081 may be a curved surface with unevenness.

In some embodiments of the present application, for each line unit on each image line in the target 2D fingerprint image, the fingerprint detection apparatus may subtract, from a width of each line unit on each image line in the first 2D fingerprint image, a width of a same line unit on a same image line in the target 2D fingerprint image, to obtain a target width corresponding to the each line unit on the each image line in the target 2D fingerprint image; and then the fingerprint detection apparatus may determine the height of the each line unit on the each image line in the target 2D fingerprint image based on the target width corresponding to the each line unit on the each image line in the target 2D fingerprint image.

Figure 44:
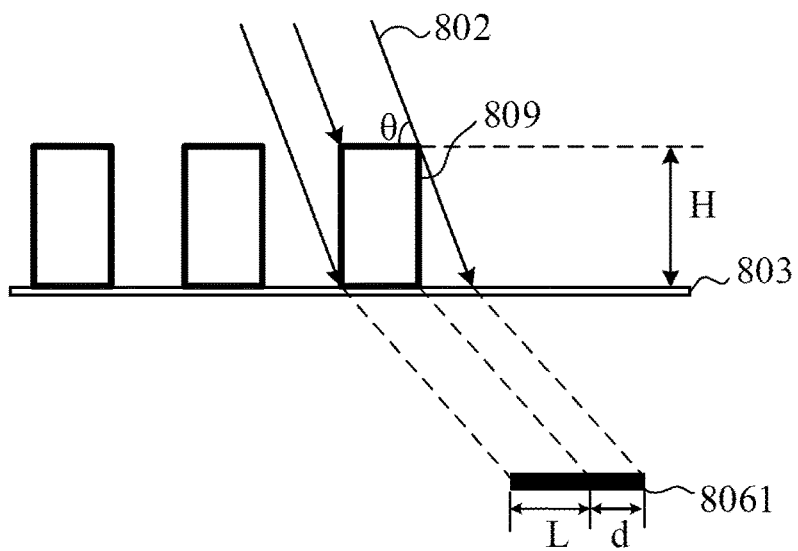
FIG. 44 is a schematic diagram of widths of image lines in the 2D fingerprint image shown in FIG. 41.

FIG. 44 is a schematic diagram of a width of a line unit of an image line in a 2D fingerprint image according to an embodiment of the present application.

As shown in FIG. 44, in an example that the first 2D fingerprint image is the 2D fingerprint image 806, it is assumed that an upper surface of a fingerprint ridge 809 of the sampled object is a plane. In this case, the fingerprint detection apparatus may determine the height of the each line unit on the each image line in the target 2D fingerprint image according to the following formula:

$$H = K \times d \times \tan \theta;$$

where H represents a height of a line unit on an image line in the target 2D fingerprint image, K represents a reduction ratio of a project of the sampled object on the display screen to the first 2D fingerprint image, d represents the target width, and θ represents an included angle between a light signal used to form the first 2D fingerprint image in the light signals in the multiple directions and a finger rigid.

In other words, the ridge 809 of a 3D fingerprint object and a light signal reflected via the 3D fingerprint object are at an included angle θ, a width L+d of a line unit generated on the 2D fingerprint image 806 is greater than a width L of a line unit of the target 2D fingerprint image by d, that is, a line generated by a side of the ridge 809 of the 3D fingerprint object. Accordingly, a height for each line unit can be acquired based on the foregoing formula, thereby acquiring the target 3D fingerprint image based on a height of each line unit on each image line.

The present application further provides a fingerprint identification apparatus for performing the method embodiments of the present application. The fingerprint identification apparatus is applicable to an electronic device having a display screen and disposed under the display screen to implement under-screen fingerprint identification.

Figure 45:
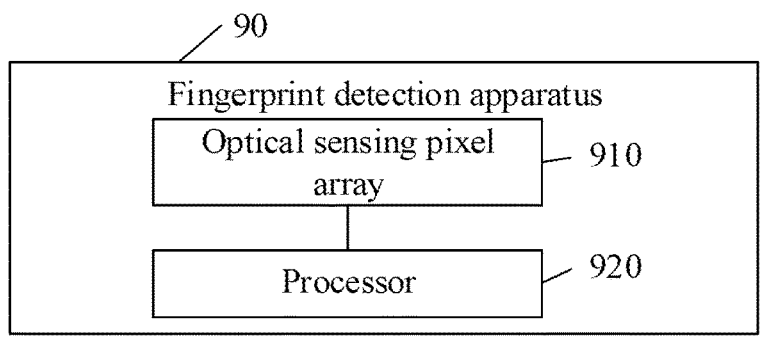
FIG. 45 is a schematic block diagram of a fingerprint detection apparatus according to an embodiment of the present application.

FIG. 45 is a schematic block diagram of a fingerprint detection apparatus 90 according to an embodiment of the present application.

As shown in FIG. 45, the fingerprint detection apparatus 90 includes:

an optical sensing pixel array 910, the optical sensing pixel array 910 being configured to acquire light signals in multiple directions reflected via a sampled object above a display screen; and a processor 920, the processor 920 being connected to the optical sensing pixel array, and the processor 920 being configured to:

receive the light signals in the multiple directions transmitted by the optical sensing pixel array, and generate a plurality of 2D fingerprint images respectively based on the light signals in the multiple directions;

determine whether the sampled object is a three-dimensional 3D object based on the plurality of 2D fingerprint images; and if the sampled object is the 3D object, perform fingerprint identification based on at least one of the plurality of 2D fingerprint images.

It should be understood that the processor 920 may be an image processor included in the fingerprint identification apparatus 90, or a processor of an electronic device to which the fingerprint detection apparatus 90 belongs, such as a central processing unit.

In some embodiments of the present application, the processor 920 is specifically configured to:

determine whether the plurality of 2D fingerprint images are the same; and if the plurality of 2D fingerprint images are different, determine that the sampled object is the 3D object.

In some embodiments of the present application, the processor 920 is more specifically configured to:

if curvature of the plurality of 2D fingerprint images with respect to a same image line is different, determine that the plurality of 2D fingerprint images are different; and/or if widths of the plurality of 2D fingerprint images with respect to a same image line are different, determine that the plurality of 2D fingerprint images are different.

In some embodiments of the present application, the processor 920 is specifically configured to:

generate a target 2D fingerprint image based on the plurality of 2D fingerprint images, image lines of the target 2D fingerprint image including image lines of the plurality of 2D fingerprint images overlapping each other; and perform the fingerprint identification based on the target 2D fingerprint image.

In some embodiments of the present application, the processor 920 is more specifically configured to:

if matching between the target 2D fingerprint image and a pre-stored 2D fingerprint image is successful, determine that the fingerprint identification is successful; and/or if matching between the target 2D fingerprint image and a pre-stored 2D fingerprint image is failed, determine that the fingerprint identification is failed.

In some embodiments of the present application, the processor 920 is more specifically configured to:

generate a target 3D fingerprint image based on the target 2D fingerprint image; and perform the fingerprint identification based on the target 3D fingerprint image.

In some embodiments of the present application, the processor 920 is more specifically configured to:

determine a height of each line unit on each image line in the target 2D fingerprint image based on the target 2D fingerprint image and a first 2D fingerprint image of the plurality of 2D fingerprint images; and generate the target 3D fingerprint image based on the height of the each line unit on the each image line in the target 2D fingerprint image.

In some embodiments of the present application, the processor 920 is more specifically configured to:

for the each line unit on the each image line in the target 2D fingerprint image, subtract, from a width of each line unit on each image line in the first 2D fingerprint image, a width of a same line unit on a same image line in the target 2D fingerprint image, to obtain a target width corresponding to the each line unit on the each image line in the target 2D fingerprint image; and determine the height of the each line unit on the each image line in the target 2D fingerprint image based on the target width corresponding to the each line unit on the each image line in the target 2D fingerprint image.

In some embodiments of the present application, the processor 920 is more specifically configured to:

determine the height of the each line unit on the each image line in the target 2D fingerprint image according to the following formula:

$$H = K \times d \times \tan\theta;$$

where H represents a height of the same line unit on the same image line in the target 2D fingerprint image, K represents a reduction ratio of a project of the sampled object on the display screen to a 2D fingerprint image of the plurality of 2D fingerprint images, d represents the target width, and θ represents an included angle between a light signal used to form the first 2D fingerprint image in the light signals in the multiple directions and a finger rigid.

In some embodiments of the present application, the processor 920 is more specifically configured to:

if matching between the target 3D fingerprint image and a pre-stored 3D fingerprint image is successful, determine that the fingerprint identification is successful; and/or if matching between the target 3D fingerprint image and a pre-stored 3D fingerprint image is failed, determine that the fingerprint identification is failed.

In some embodiments of the present application, the light signals in the multiple directions include a light signal perpendicular relative to the display screen and a light signal oblique relative to the display screen; or the light signals in the multiple directions include light signals oblique relative to the display screen.

It should be understood that the fingerprint detection apparatus 90 and the method 70 may correspond to each other, and the similar description may refer to the method embodiments. Specifically, the fingerprint detection apparatus 90 shown in FIG. 45 may correspond to a corresponding main body for executing the method 70 in the embodiment of the present application, foregoing and other operations and/or functions of respective units in the fingerprint detection apparatus 90 are receptively to achieve corresponding procedures in the method 70, which is not repeated redundantly herein for concision.

It should also be understood that the method 70 may be implemented in a form of hardware, by an instruction in a form of software, or in a combination of hardware and software modules. Specifically, steps of the method embodiment in the embodiments of the present application may be completed by using an integrated logical circuit of hardware in the processor or an instruction in a form of software. Steps of the method disclosed in the embodiments of the present application may be directly executed and completed by using a hardware decoding processor, or may be executed and completed by using a combination of hardware and software modules in the decoding processor.

The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method embodiments in combination with hardware of the processor.

The preferred embodiments of the present application are described in detail above with reference to the accompanying drawings. However, the present application is not limited to specific details in the foregoing embodiments. Within the technical concept of the present application, a variety of simple variants may be carried out on the technical solutions of the present application, and all of the simple variants are within the protection scope of the present application.

For example, various specific technical features described in the foregoing specific embodiments may be combined in any suitable manner under the condition of no contradiction. In order to avoid unnecessary repetition, various possible combination ways will not be separately described in the present application.

For another example, any combination may be made between various embodiments of the present application without departing from the idea of the present application, and it should also be regarded as the disclosure of the present application.

It should be understood that sequence numbers of the foregoing processes do not mean execution sequences in various method embodiments of the present application. The execution sequences of the processes should be determined according to functions and internal logic of the processes, and should not be construed as any limitation on the implementation processes of the embodiments of the present application.

An embodiment of the present application further provides an electronic device, and the electronic device may include a display screen and the fingerprint detection apparatus according to the foregoing embodiments of the present application, where the fingerprint detection apparatus is disposed under the display screen to implement under-screen optical fingerprint detection.

The electronic device may be any electronic device having a display screen. For example, the electronic device may be the electronic device 10 shown in FIG. 1 to FIG. 4.

The display screen may use the display screen in the above description, such as an OLED display screen or other display screens. For a description of the display screen, reference may be made to illustration of the display screen in the above description, and for brevity, no further details are provided herein.

It should be understood that specific examples in embodiments of the present application are just for helping those skilled in the art better understand the embodiments of the present application, rather than for limiting the scope of the embodiments of the present application.

It should be understood that terms used in embodiments of the present application and the claims appended hereto are merely for the purpose of describing particular embodiments, and are not intended to limit the embodiments of the present application. For example, the use of a singular form of "a", "the above" and "said" in the embodiments of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are performed by hardware or software depends on particular applications and designed constraint conditions of the technical solutions. Persons skilled in the art may use different methods to implement the described functions for each particular application, but it should not be considered that the implementation goes beyond the scope of the present application.

In the several embodiments provided in the present application, it should be understood that, the disclosed system and apparatus may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual coupling or direct coupling or communication connection may be indirect coupling or communication connection through some interfaces, apparatuses or units, and may also be electrical, mechanical, or connection in other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If the integrated unit is implemented in the form of the software functional unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, a network device, or the like) to execute all of or part of the steps of the method described in the embodiments of the present application. The storage medium includes: various media that may store program codes, such as a U-disk, a removable hard disk, a read-only memory (ROM), a random access memory (RAM), a magnetic disk, a compact disk, and so on.

The foregoing descriptions are merely specific embodiments of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A method for identifying a fingerprint, wherein the method is applicable to an electronic device having a display screen to implement under-screen fingerprint identification, and the method comprises:
    acquiring light signals in multiple directions reflected via a sampled object above the display screen;
    generating a plurality of two-dimensional (2D) fingerprint images respectively based on the light signals in the multiple directions, wherein a light signal in each direction of the light signals in the multiple directions is configured to generate one of the plurality of 2D fingerprint images;
    determining whether the sampled object is a three-dimensional (3D) object based on the plurality of 2D fingerprint images; and
    when the sampled object is the 3D object, performing fingerprint identification based on at least one of the plurality of 2D fingerprint images,
    wherein the determining whether the sampled object is the three-dimensional 3D object based on the plurality of 2D fingerprint images, comprises:
        determining whether the plurality of 2D fingerprint images are the same; and
        when the plurality of 2D fingerprint images are different, determining that the sampled object is the 3D object;
    wherein the determining whether the plurality of 2D fingerprint images are the same, comprises:
        when curvature of the plurality of 2D fingerprint images with respect to a same image line is different, determining that the plurality of 2D fingerprint images are different; and/or
        when widths of the plurality of 2D fingerprint images with respect to a same image line are different, determining that the plurality of 2D fingerprint images are different.

2. The method according to claim 1, wherein the performing the fingerprint identification based on the at least one of the plurality of 2D fingerprint images, comprises:
    generating a target 2D fingerprint image based on the plurality of 2D fingerprint images, image lines of the target 2D fingerprint image comprising image lines of the plurality of 2D fingerprint images overlapping each other; and
    performing the fingerprint identification based on the target 2D fingerprint image.

3. The method according to claim 2, wherein the performing the fingerprint identification based on the target 2D fingerprint image, comprises:
    when matching between the target 2D fingerprint image and a pre-stored 2D fingerprint image is successful, determining that the fingerprint identification is successful; and/or
    when matching between the target 2D fingerprint image and a pre-stored 2D fingerprint image is failed, determining that the fingerprint identification is failed.

4. The method according to claim 2, wherein the performing the fingerprint identification based on the target 2D fingerprint image, comprises:
    generating a target 3D fingerprint image based on the target 2D fingerprint image; and
    performing the fingerprint identification based on the target 3D fingerprint image.

5. The method according to claim 4, wherein the generating the target 3D fingerprint image based on the target 2D fingerprint image, comprises:
    determining a height of each line unit on each image line in the target 2D fingerprint image based on the target 2D fingerprint image and a first 2D fingerprint image of the plurality of 2D fingerprint images; and
    generating the target 3D fingerprint image based on the height of the each line unit on the each image line in the target 2D fingerprint image.

6. The method according to claim 5, wherein the determining the height of the each line unit on the each image line in the target 2D fingerprint image based on the target 2D fingerprint image and the first 2D fingerprint image of the plurality of 2D fingerprint images, comprises:
    for the each line unit on the each image line in the target 2D fingerprint image, subtracting, from a width of each line unit on each image line in the first 2D fingerprint image, a width of a same line unit on a same image line in the target 2D fingerprint image, to obtain a target width corresponding to the each line unit on the each image line in the target 2D fingerprint image; and
    determining the height of the each line unit on the each image line in the target 2D fingerprint image based on the target width corresponding to the each line unit on the each image line in the target 2D fingerprint image.

7. The method according to claim 6, wherein the determining the height of the each line unit on the each image line in the target 2D fingerprint image based on the target width corresponding to the each line unit on the each image line in the target 2D fingerprint image, comprises:
    determining the height of the each line unit on the each image line in the target 2D fingerprint image according to the following formula:

$$H = K \times d \times \tan\theta;$$

wherein H represents a height of a line unit on an image line in the target 2D fingerprint image, K represents a reduction ratio of a project of the sampled object on the display screen to the first 2D fingerprint image, d represents the target width, and θ represents an included angle between a light signal used to form the first 2D fingerprint image in the light signals in the multiple directions and a finger rigid.

8. The method according to claim 4, wherein the performing the fingerprint identification based on the target 3D fingerprint image, comprises:
    when matching between the target 3D fingerprint image and a pre-stored 3D fingerprint image is successful, determining that the fingerprint identification is successful; and/or
    when matching between the target 3D fingerprint image and a pre-stored 3D fingerprint image is failed, determining that the fingerprint identification is failed.

9. The method according to claim 1, wherein the light signals in the multiple directions comprise a light signal perpendicular relative to the display screen and a light signal oblique relative to the display screen; or the light signals in the multiple directions comprise light signals oblique relative to the display screen.

10. A fingerprint identification apparatus, wherein the fingerprint identification apparatus is applicable to an electronic device having a display screen and disposed under the display screen to implement under-screen fingerprint identification; and the fingerprint identification apparatus comprises:
an optical sensing pixel array, the optical sensing pixel array being configured to acquire light signals in multiple directions reflected via a sampled object above the display screen; and
a processor, the processor being connected to the optical sensing pixel array, and the processor being configured to:
receive the light signals in the multiple directions transmitted by the optical sensing pixel array, and generate a plurality of two-dimensional (2D) fingerprint images respectively based on the light signals in the multiple directions, wherein a light signal in each direction of the light signals in the multiple directions is configured to generate one of the plurality of 2D fingerprint images;
determine whether the sampled object is a three-dimensional (3D) object based on the plurality of 2D fingerprint images; and
when the sampled object is the 3D object, perform fingerprint identification based on at least one of the plurality of 2D fingerprint images,
wherein the processor is specifically configured to:
determine whether the plurality of 2D fingerprint images are the same; and
when the plurality of 2D fingerprint images are different, determine that the sampled object is the 3D object;
wherein the processor is more specifically configured to:
when curvature of the plurality of 2D fingerprint images with respect to a same image line is different, determine that the plurality of 2D fingerprint images are different; and/or
when widths of the plurality of 2D fingerprint images with respect to a same image line are different, determine that the plurality of 2D fingerprint images are different.

11. The fingerprint identification apparatus according claim 10, wherein the processor is specifically configured to:
generate a target 2D fingerprint image based on the plurality of 2D fingerprint images, image lines of the target 2D fingerprint image comprising image lines of the plurality of 2D fingerprint images overlapping each other; and
perform the fingerprint identification based on the target 2D fingerprint image.

12. The fingerprint identification apparatus according to claim 11, wherein the processor is more specifically configured to:
when matching between the target 2D fingerprint image and a pre-stored 2D fingerprint image is successful, determine that the fingerprint identification is successful; and/or
when matching between the target 2D fingerprint image and a pre-stored 2D fingerprint image is failed, determine that the fingerprint identification is failed.

13. The fingerprint identification apparatus according to claim 11, wherein the processor is more specifically configured to:
generate a target 3D fingerprint image based on the target 2D fingerprint image; and
perform the fingerprint identification based on the target 3D fingerprint image.

14. The fingerprint identification apparatus according to claim 13, wherein the processor is more specifically configured to:
determine a height of each line unit on each image line in the target 2D fingerprint image based on the target 2D fingerprint image and a first 2D fingerprint image of the plurality of 2D fingerprint images; and
generate the target 3D fingerprint image based on the height of the each line unit on the each image line in the target 2D fingerprint image.

15. The fingerprint identification apparatus according to claim 14, wherein the processor is more specifically configured to:
for the each line unit on the each image line in the target 2D fingerprint image, subtract, from a width of each line unit on each image line in the first 2D fingerprint image, a width of a same line unit on a same image line in the target 2D fingerprint image, to obtain a target width corresponding to the each line unit on the each image line in the target 2D fingerprint image; and
determine the height of the each line unit on the each image line in the target 2D fingerprint image based on the target width corresponding to the each line unit on the each image line in the target 2D fingerprint image;
wherein the processor is more specifically configured to:
determine the height of the each line unit on the each image line in the target 2D fingerprint image according to the following formula:

$H = K \times d \times \tan \theta;$ wherein H represents a height of the same line unit on the same image line in the target 2D fingerprint image, K represents a reduction ratio of a project of the sampled object on the display screen to the first 2D fingerprint image of the plurality of 2D fingerprint images, d represents the target width, and θ represents an included angle between a light signal used to form the first 2D fingerprint image in the light signals in the multiple directions and a finger rigid.

16. The fingerprint identification apparatus according to claim 13, wherein the processor is more specifically configured to:
when matching between the target 3D fingerprint image and a pre-stored 3D fingerprint image is successful, determine that the fingerprint identification is successful; and/or
when matching between the target 3D fingerprint image and a pre-stored 3D fingerprint image is failed, determine that the fingerprint identification is failed.

17. The fingerprint identification apparatus according to claim 10, wherein the light signals in the multiple directions comprise a light signal perpendicular relative to the display screen and a light signal oblique relative to the display screen; or the light signals in the multiple directions comprise light signals oblique relative to the display screen.

18. An electronic device, wherein the electronic device comprises:
a display screen; and
a fingerprint identification apparatus, wherein the fingerprint identification apparatus is disposed under a display region of the display screen to implement under-screen fingerprint identification;
the fingerprint identification apparatus comprises:
an optical sensing pixel array, the optical sensing pixel array being configured to acquire light signals in multiple directions reflected via a sampled object above the display screen; and
a processor, the processor being connected to the optical sensing pixel array, and the processor being configured to:

receive the light signals in the multiple directions transmitted by the optical sensing pixel array, and generate a plurality of two-dimensional 2D fingerprint images respectively based on the light signals in the multiple directions, wherein a light signal in each direction of the light signals in the multiple directions is configured to generate one of the plurality of 2D fingerprint images;

determine whether the sampled object is a three-dimensional 3D object based on the plurality of 2D fingerprint images; and when the sampled object is the 3D object, perform fingerprint identification based on at least one of the plurality of 2D fingerprint images;

wherein the determining whether the sampled object is the three-dimensional 3D object based on the plurality of 2D fingerprint images, comprises:

determining whether the plurality of 2D fingerprint images are the same; and when the plurality of 2D fingerprint images are different, determining that the sampled object is the 3D object;

wherein the determining whether the plurality of 2D fingerprint images are the same, comprises:

when curvature of the plurality of 2D fingerprint images with respect to a same image line is different, determining that the plurality of 2D fingerprint images are different; and/or when widths of the plurality of 2D fingerprint images with respect to a same image line are different, determining that the plurality of 2D fingerprint images are different.

* * * * *